US010943253B1

(12) United States Patent
Aggarwal et al.

(10) Patent No.: US 10,943,253 B1
(45) Date of Patent: Mar. 9, 2021

(54) CONSUMER CROSS-CATEGORY DEAL DIVERSITY

(71) Applicant: Groupon, Inc., Chicago, IL (US)

(72) Inventors: Amit Aggarwal, Sunn, CA (US); Michalis Potamias, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 317 days.

(21) Appl. No.: 13/841,433

(22) Filed: Mar. 15, 2013

Related U.S. Application Data

(60) Provisional application No. 61/702,431, filed on Sep. 18, 2012.

(51) Int. Cl.
    G06Q 30/02 (2012.01)
(52) U.S. Cl.
    CPC .............................. G06Q 30/0243 (2013.01)
(58) Field of Classification Search
    USPC .............................................................. 705/14
    See application file for complete search history.

(56) References Cited

U.S. PATENT DOCUMENTS

| | | | | |
|---|---|---|---|---|
| 8,359,238 B1 * | 1/2013 | Kauchak | ................ | G06Q 30/02 705/14.66 |
| 8,407,085 B1 * | 3/2013 | Wu | ..................... | G06O 30/0261 705/14.1 |
| 2002/0161664 A1 * | 10/2002 | Shaya | ................ | G06Q 30/0254 705/7.31 |
| 2008/0065490 A1 * | 3/2008 | Novick | ................ | G06Q 20/204 705/14.26 |
| 2009/0271263 A1 * | 10/2009 | Regmi et al. | .............. | 705/14.17 |
| 2010/0211455 A1 * | 8/2010 | Williams | ........... | G06Q 30/0243 705/14.42 |
| 2010/0250351 A1 * | 9/2010 | Gillenson et al. | ......... | 705/14.13 |
| 2010/0318407 A1 * | 12/2010 | Leff | .................... | G06O 30/0207 705/14.1 |
| 2011/0035273 A1 * | 2/2011 | Parikh | .................... | G06Q 30/02 705/14.42 |
| 2011/0078026 A1 * | 3/2011 | Durham | ............. | G06Q 30/0269 705/14.66 |
| 2011/0153412 A1 * | 6/2011 | Novikov | ............ | G06Q 30/0269 705/14.42 |

(Continued)

FOREIGN PATENT DOCUMENTS

| | | | | |
|---|---|---|---|---|
| WO | WO-0060517 A2 * | 10/2000 | ............. | G06Q 30/02 |
| WO | WO 2000060517 A2 * | 10/2000 | ............. | G06F 17/60 |

OTHER PUBLICATIONS

Ranking of New Sponsored Online Ads, Hamed Sadeghi Neshat (Year: 2011).*

(Continued)

*Primary Examiner* — Gautam Ubale
(74) *Attorney, Agent, or Firm* — Alston & Bird LLP

(57) ABSTRACT

A system and method is provided for determining a portfolio of promotions from across a diverse mix of promotion categories. The diverse promotion portfolio may represent an inventory of promotions that are available for presenting to a consumer in a particular market. Also, a system and method is provided for determining a diverse group of promotions for presenting to a consumer. The diverse group of promotions may be determined based on whether a same or similar promotion was previously presented to the consumer.

8 Claims, 8 Drawing Sheets

(56) References Cited

U.S. PATENT DOCUMENTS

| | | | | |
|---|---|---|---|---|
| 2011/0231321 | A1* | 9/2011 | Milne | G06Q 30/0251 |
| | | | | 705/80 |
| 2011/0313852 | A1* | 12/2011 | Kon et al. | 705/14.46 |
| 2012/0166267 | A1* | 6/2012 | Beatty | G06Q 30/0219 |
| | | | | 705/14.21 |
| 2013/0073381 | A1* | 3/2013 | Binkley | 705/14.48 |
| 2013/0231999 | A1* | 9/2013 | Emrich | G06Q 30/0271 |
| | | | | 705/14.43 |
| 2013/0246148 | A1* | 9/2013 | Ross | G06O 30/0224 |
| | | | | 705/14.25 |

OTHER PUBLICATIONS

Personalized Scheduling Search Advertisement by Mining the History Behaviours of Users, Guangyi Xiao, Zhiguo Gong, Jingzhi Guo (Year: 2009).*
U.S. Appl. No. 13/411,502, filed Mar. 2, 2013; First Named Inventor: O'Brien.
U.S. Appl. No. 13/839,786, filed Mar. 15, 2013; First Named Inventor: Daly.
U.S. Appl. No. 13/460,745.
U.S. Appl. No. 13/838,874, filed Mar. 15, 2013; First Named Inventor: Potamias.
U.S. Appl. No. 61/644,352.
U.S. Appl. No. 61/675,769.
U.S. Appl. No. 61/695,857.

* cited by examiner

Table 4

| | ≤$15 | $15 - $30 | $31 - $50 | $51 - $100 | $101 - $150 | $151 - $200 | $201 - $300 | Reward Value | Risk Value |
|---|---|---|---|---|---|---|---|---|---|
| Proposed Portfolio 1 | 10% | 2% | 19% | 30% | 25% | 2% | 12% | $9,767 | $969 |
| Proposed Portfolio 2 | 14% | 2% | 23% | 22% | 25% | 2% | 12% | $9,494 | $946 |
| Proposed Portfolio 3 | 18% | 2% | 25% | 17% | 25% | 2% | 11% | $9,311 | $949 |

CONSUMER CROSS-CATEGORY DEAL DIVERSITY

REFERENCE TO RELATED APPLICATION

This application claims the benefit of U.S. Provisional Application No. 61/702,431, filed Sep. 18, 2012, the entirety of which is hereby incorporated by reference herein.

FIELD OF THE INVENTION

The present description relates to offering promotions associated with a product or a service. This description more specifically relates to a promotion offering system for better ensuring the presentation of a diverse mix of promotions from across a plurality of promotion categories to a consumer.

DESCRIPTION OF THE RELATED ART

Merchants typically offer promotions to consumers from time to time in order to generate more business. The promotions offered may be in the form of discounts, deals, rewards or the like. Oftentimes, a promotional offering may be presented to a consumer in the form of an electronic correspondence that is transmitted at certain times throughout a given time period (e.g. throughout the day). In the past, the promotions that were selected for presentation to a consumer were selected manually without the benefit of referencing pertinent data.

SUMMARY OF THE INVENTION

An apparatus and method for analyzing electronic correspondences that include one or more promotions is disclosed.

According to one aspect, a method is provided for including a diversity of promotions in multiple electronic correspondence, the method includes: considering accessing one or more promotions included in a previously-sent electronic correspondence; accessing multiple promotions contemplated for inclusion in a subsequent electronic correspondence; comparing taxonomy classification for at least one of the promotions in the previously-sent electronic correspondence and one of the multiple promotions contemplated for inclusion in the subsequent electronic correspondence in order to determine whether the at least one of the promotions in the previously-sent electronic correspondence and the one of the multiple promotions contemplated for inclusion in the subsequent electronic correspondence has a same taxonomy classification; and in response to the same taxonomy classification, determining whether to remove the one of the multiple promotions contemplated for inclusion in the subsequent electronic correspondence.

According to another aspect, an system is provided for including a diversity of promotions in multiple electronic correspondence, the system including: a memory storing processor-executable instructions; and a processor in communication with the memory. The processor is configured to execute the processor-executable instructions to: access one or more promotions included in a previously-sent electronic correspondence; access multiple promotions contemplated for inclusion in a subsequent electronic correspondence; compare taxonomy classification for at least one of the promotions in the previously-sent electronic correspondence and one of the multiple promotions contemplated for inclusion in the subsequent electronic correspondence in order to determine whether the at least one of the promotions in the previously-sent electronic correspondence and the one of the multiple promotions contemplated for inclusion in the subsequent electronic correspondence has a same taxonomy classification; and in response to the same taxonomy classification, determine whether to remove the one of the multiple promotions contemplated for inclusion in the subsequent electronic correspondence.

According to yet another aspect, a method is provided for including a diversity of promotions within an electronic correspondence, the method comprising: accessing multiple promotions contemplated for inclusion in the electronic correspondence, each of the multiple promotions including an associated taxonomy classification; comparing the taxonomy classification for at least two of the multiple promotions in order to determine whether the at least two of the multiple promotions have a same taxonomy classification; and in response to determining that the at least two of the multiple promotions have the same taxonomy classification, determining to remove one of the at least two of the multiple promotions from inclusion in the electronic correspondence.

According to still another aspect, a system is provided for including a diversity of promotions within an electronic correspondence. The system including: a memory storing processor-executable instructions; and a processor in communication with the memory. The processor is configured to execute the processor-executable instructions to: access multiple promotions contemplated for inclusion in the electronic correspondence, each of the multiple promotions including an associated taxonomy classification; compare the taxonomy classification for at least two of the multiple promotions in order to determine whether the at least two of the multiple promotions have a same taxonomy classification; and in response to determining that the at least two of the multiple promotions have the same taxonomy classification, determine to remove one of the at least two of the multiple promotions from inclusion in the electronic correspondence.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 4 illustrates a table exemplifying promotion categories related to a range of values;

DETAILED DESCRIPTION

Figure 1:
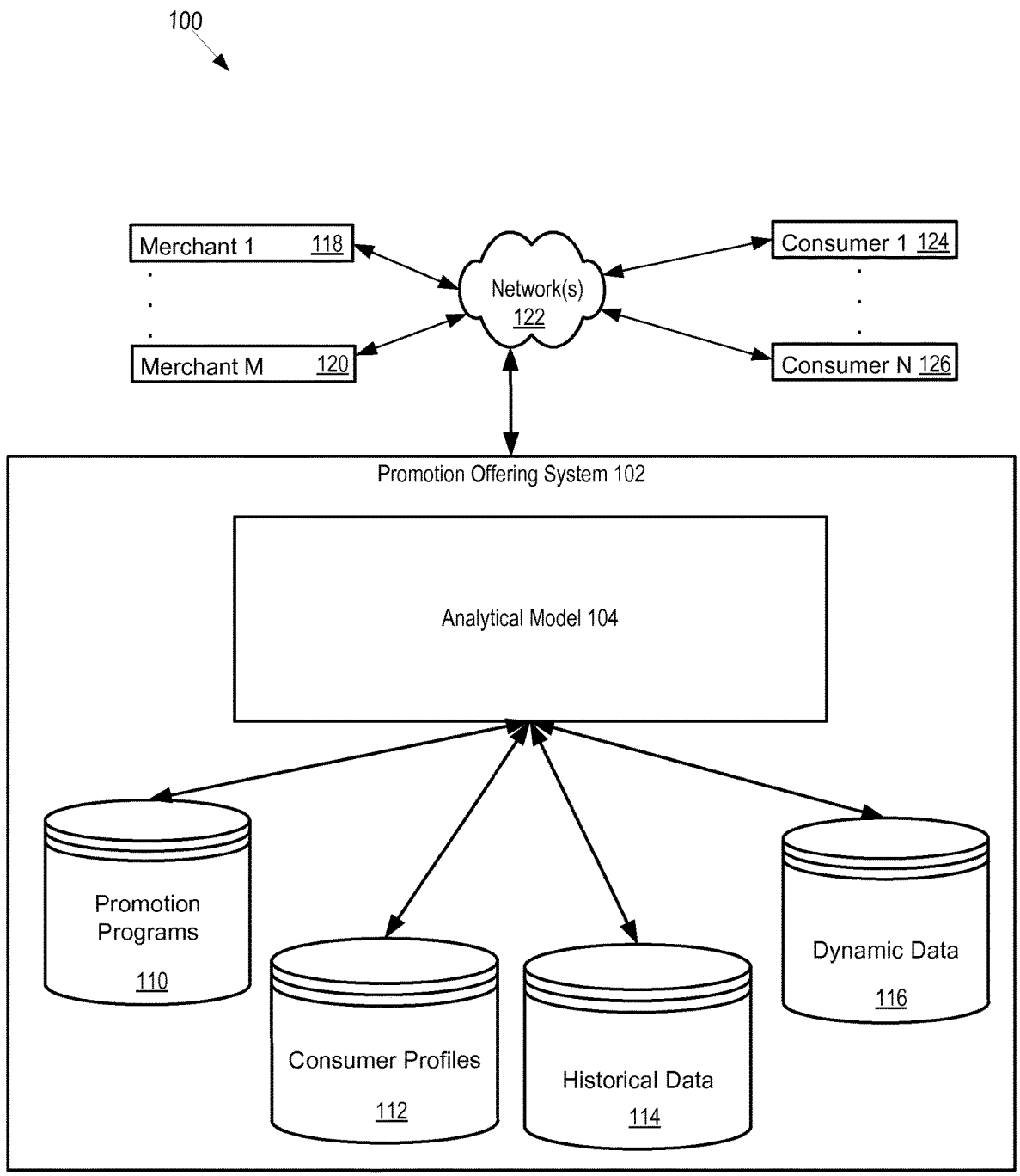
FIG. 1 illustrates a representation of a network and a plurality of devices that interact with the network.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. It should be noted that promotions and deals are recited in this disclosure to be understood as being interchangeable, unless specifically stated otherwise.

A promotion may include any type of reward, discount, coupon, credit, deal, voucher or the like used toward part (or all) of the purchase of a product or a service. The promotion may also include merchandise goods that are offered for sale. For instance, goods promotions may include offers for sale of clothing, electronic devices, school supplies, jewelry, sporting goods, kitchen goods, cosmetic goods and the like. The promotion may be offered as part of a larger promotion program, or the promotion may be offered as a stand-alone one-time promotion.

In an effort to better distinguish and identify the promotion, the promotion may be identified by one or more attributes, such as the merchant offering the promotion (e.g., "XYZ coffee shop"), the location of the promotion, the amount or price range of the promotion, the category of the promotion (such as a restaurant promotion, a spa promotion, a travel promotion, a local promotion, etc.), the sub-category of the promotion (such as a Japanese restaurant, a Massage promotion, a Caribbean cruise promotion, and a local farmer's market promotion, etc.), amount of discount offered by the promotion, time at which the promotion is likely to be purchased by a consumer (e.g., a breakfast meal promotion may have a greater likelihood of being purchased by a consumer in the morning time), time at which the promotion is redeemable (e.g., a breakfast meal promotion may only be redeemable during breakfast hours), time or time period for which the promotion is related to (e.g., a breakfast meal promotion is related to a morning time period), or the like. Any one of the described attributes may then be used to define a corresponding promotion category.

Promotions may be selected for inclusion in an electronic correspondence based on whether one or more similar promotions have been presented to the consumer previously. By referencing whether similar promotions have been previously presented to the consumer, over-presentation of similar promotions may be avoided; instead, the consumer may receive with a diverse mix of promotions across a plurality of promotion categories from which to choose.

Presenting the consumer with electronic correspondences that include similar promotions in consecutive, or nearly consecutive, time periods that are close together may cause the consumer to view the electronic correspondences as being repetitive and stale. This in turn may cause the consumer to avoid opening the emails in the future, which decreases the rate at which the consumer purchases promotions from the promotion system 100. Therefore, the presentation of similar promotions over a relatively short time period may negatively impact the probability the consumer will purchase subsequent promotions.

In addition, although performance data may indicate that the consumer has a tendency to purchase promotions from a certain promotion category (e.g., restaurant deals), to only present promotions from this promotion category may not result in the optimal conversion rate of purchases from the consumer. Therefore, providing a diverse mix of promotions from across different promotion categories in the electronic correspondence presented to the consumer is desirable. By doing so, the probability the consumer maintains an interest in the promotions within the electronic correspondence may increase, and the probability the consumer purchases one or more of the promotions in the email may correspondingly increase.

In one example, different factors may be analyzed in order to provide a consumer with the diverse mix of promotions. Factors include, but are not limited to: taxonomy; merchant data; and consumer profile. Taxonomy comprises any classification of the promotion. As discussed below, examples of taxonomy include, but are not limited to: category/subcategory and deal types.

Further, the analysis may be applied to electronic correspondence in a variety of ways. Electronic correspondence may take the form of an email, SMS text message, webpage inbox message, VOIP voice message, real-time webpage content presentation, mobile push notifications or other similar types of electronic correspondences where information is "pushed" onto a consumer. The analysis may be applied to the electronic correspondence in several respects, including inter-electronic correspondence and intra-electronic correspondence. Inter-electronic correspondence analysis comprises analyzing multiple electronic correspondence for a diverse mix of promotions. The multiple electronic correspondence may be of the same type (e.g., both e-mails) or may be of different types (e.g., one e-mail one SMS text message). Further, the multiple electronic correspondence may comprise 2, 3, or more in number. Moreover, the multiple electronic correspondence may be sent periodically (such as daily) or may be sent a-periodically. Intra-electronic correspondence analysis comprises analyzing a single electronic correspondence for a diverse mix of promotions.

The system may examine inter-electronic correspondence according to one or more factors, such as: the taxonomy of promotion(s) that the consumer received in the previous electronic correspondence (e.g., in one or more previous electronic correspondence) versus the promotions considered for inclusion in a subsequent electronic correspondence (e.g., an as-yet-to-be-sent electronic correspondence); the merchant(s) offering the promotion(s) included in the previous electronic correspondence versus the merchant(s) considered for inclusion in the subsequent electronic correspondence; and/or the purchase(s) that the consumer has made.

In a first type of taxonomy analysis, a determination is made as to whether a same category and/or subcategory is included in the previous electronic correspondence and the subsequent electronic correspondence (e.g., examining whether the most recently sent electronic correspondence includes a same category or subcategory as the subsequent electronic correspondence; examining whether the a second most recently sent electronic correspondence includes a same category or subcategory as the subsequent electronic correspondence; etc.) In the event that a same category and/or subcategory is included, the promotion contemplated for inclusion in the subsequent electronic correspondence may be removed and a different promotion may be selected. In one embodiment, the removal of the promotion may be dependent on an amount of time between the transmission of the previous electronic correspondence and the expected transmission of the subsequent electronic correspondence. In the event that the amount of time is greater than a predetermined amount of time period (which may be the same across some or all of the categories and/or subcategories), the promotion may be included in the subsequent electronic correspondence.

The different promotion may be selected based on other criteria (such as based on an estimated acceptance by the consumer, discussed below). Alternatively, or in addition, the different promotion may be selected based on the identified category or subcategory that was similar. More specifically, the different promotion may be selected so that the category or subcategory for the different promotion is separated sufficiently from the identified category or subcategory. For example, the selection of the category or subcategory in the different promotion may be at least a predetermined distance, such as measured by nodes of the multi-level hierarchy structure, so that the different promotion is considered distinguishable from the promotion previously presented.

In a second type of taxonomy analysis, a determination is made as to which same category or subcategory is included in the previous electronic correspondence and the subsequent electronic correspondence. The category or subcategory identified as the same between the previous electronic correspondence and the subsequent electronic correspondence may affect the analysis. For example, different categories or subcategories may implicate different levels of diversity. More specifically, a promotion category of "restaurant" may allow for more frequent viewings, whereas a promotion category of "boating" may allow for less frequent viewings. In this regard, if a promotion in the previous electronic correspondence and a promotion contemplated for the subsequent electronic correspondence designate a "restaurant" category, the analysis may determine that the promotion contemplated for the subsequent electronic correspondence may be included since the "restaurant" category allows for more frequent viewings. Conversely, if the promotion in the previous electronic correspondence and the promotion contemplated for the subsequent electronic correspondence designate a "boating" category, the analysis may determine that the promotion contemplated for the subsequent electronic correspondence not be included since the "boating" category does not allow for as frequent viewings.

The frequency of the viewings for specific categories and subcategories may be included in a data construct correlating the frequency to the category/subcategory. More specifically, the frequency may be manifested in a time period correlated to the category and/or subcategory. In this regard, the system may determine the amount of time between the transmission of the previous electronic correspondence and the expected transmission of the subsequent electronic correspondence. In the event that the amount of time is greater than the time period correlated to the category and/or subcategory, the promotion may be included in the subsequent electronic correspondence. For example, the time period associated with the "restaurant" category may be 2 days. In the event that the amount of time between transmission of the previous electronic correspondence and transmission of the subsequent correspondence is 1 day, the promotion may be removed.

In a first type of consumer profile analysis, the consumer profile may be reviewed to determine whether the consumer purchased, within a predetermined time, a promotion from a same category or subcategory as the promotion contemplated for the subsequent electronic correspondence. For example, the analysis may determine whether the consumer purchased within the past day, the past week, the past month, etc. a promotion from category "X". In the event that the contemplated promotion is assigned category "X", the analysis may determine to reject inclusion of the contemplated promotion (or alternatively, determine to reject inclusion if the consumer purchase was less than a predetermined number of days).

In a second type of consumer profile analysis, a determination is made as to which same category or subcategory is included in the contemplated promotion in the subsequent electronic correspondence and the customer's purchase. The category or subcategory identified as the same between the contemplated promotion in the subsequent electronic correspondence and the consumer's purchase may affect the analysis. For example, different categories or subcategories may implicate different levels of diversity. More specifically, a promotion subcategory of "Lasik surgery" may allow for less frequent viewing, whereas a promotion category of "restaurant" may allow for less frequent viewings. In this regard, if the consumer purchased a promotion with the subcategory "Lasik surgery", the contemplated promotion that includes the subcategory "Lasik surgery" may not be included in the subsequent electronic correspondence if the time period between the purchase and the upcoming viewing of the subsequent promotion is less than a predetermined time period (e.g., less than 1 year). Conversely, if the consumer purchased a promotion with the category "restaurant", the contemplated promotion that includes the category "restaurant" may be included in the subsequent electronic correspondence if the time period between the purchase and the upcoming viewing of the subsequent promotion is less than a different predetermined time period (e.g., less than 2 days). In this regard, the analysis may account for more frequent purchases of promotions with the "restaurant" category than for promotions with the "Lasik surgery" subcategory.

In an alternate embodiment, the time period between a consumer's purchase of a promotion from a specific category or subcategory and a subsequent presentation may be defined by the consumer's purchasing habits. The consumer profile, which may include a history of purchases by the consumer, may be analyzed to determine a frequency of purchases, such as a frequency of purchases correlated to a specific category or subcategory. In this regard, the time period may be selected to match, or nearly match, the time period as measured from the consumer's past purchases. For example, if a consumer on average, purchases a restaurant promotion once every week, the time period selected may be 1 week.

In a first type of merchant analysis, a determination is made as to whether a same merchant is included in the previous electronic correspondence and the subsequent electronic correspondence. In the event that the same merchant is included, the promotion contemplated for inclusion in the subsequent electronic correspondence may be removed and a different promotion may be selected. The different promotion may be selected based on other criteria (such as based on an estimated acceptance by the consumer, discussed below).

In a second type of merchant analysis, a determination is made as to which same merchant is included in the previous electronic correspondence and the subsequent electronic correspondence. The merchant identified as the same between the previous electronic correspondence and the subsequent electronic correspondence may affect the analysis. More specifically, different merchants may implicate different levels of diversity or frequency of presentation.

With regard to intra-electronic correspondence, the system may examine the taxonomy of promotions. For example, the subsequent electronic correspondence includes a plurality of contemplated promotions, as discussed in more detail below. In the event that two promotions, both contemplated for inclusion in the subsequent electronic correspondence, include a same category or subcategory, the system may remove one of the two promotions. For example, both of the promotions may have associated scores. In this regard, the promotion with the lower associated score may be removed.

As discussed in more detail below, the subsequent electronic correspondence may have "N" number of positions, where N may comprise 1, 2, or more in number. An example of electronic correspondence with multiple positions is illustrated in U.S. application Ser. No. 13/839,786, hereby incorporated herein in its entirety. The system may score a multitude of promotions, and rank the multitude of promotions based on the scores. The taxonomy classification analysis may be performed for the top "N" ranked promotions. In the event that two of the top "N" ranked promotions have the same taxonomy classification, another promotion from the multitude of promotions may be selected for further analysis. For example, the "N+1" ranked promotion may be examined. Further description is provided below.

FIG. 1 illustrates an overview for a promotion system 100 configured to offer promotions for promotion programs. The promotion system 100 includes a promotion offering system 102, which communicates via one or more networks 122 with consumers, such as consumer 1 (124) to consumer N (126), and with merchants, such as merchant 1 (118) to merchant M (120). The promotion offering system 102 also includes analytical model 104 that is in communication with databases 110, 112, 114, 116.

The analytical model 104 may include one or more components for generating an electronic correspondence for including one or more promotions for presentation to the consumer according to this invention. The electronic correspondence may be presented to the consumer by transmission, or interactive display, of the electronic correspondence taking the form of an email, SMS text message, webpage inbox message, VOIP voice message, real-time webpage content presentation, mobile push notifications or other similar types of electronic correspondences.

The electronic correspondence may include one or more promotions that have been selected to better ensure the consumer is presented with a diverse mix of promotions from across difference promotion categories. The electronic correspondence may be generated to have one or more set positions for assigning each of the one or more promotions that are included in the electronic correspondence. In addition, each position within the electronic correspondence may be designated with a level of desirability. For example, positions that are closer to the top of the electronic correspondence may be assigned a higher level of desirability than positions that are lower down on the electronic correspondence. This is because the consumer that is viewing the electronic correspondence has a higher likelihood of viewing promotions that are displayed at the top of the electronic correspondence than promotions that are displayed closer to the bottom of the electronic correspondence. This may hold true for each of the different forms of electronic correspondences mentioned above. The consumer may open up an electronic correspondence in the form of an email, and the consumer will be more likely to view the promotions that are closer to the top of the email than promotions that are closer to the bottom of the email. Similarly, the consumer may view an interactive display of promotions on an electronic correspondence in the form of a webpage, and the consumer will be more likely to view the promotions that are closer to the top of the webpage than promotions that are closer to the bottom of the webpage.

In order to take advantage of more desirable positions within the electronic correspondence, promotions that have a higher score (e.g., past conversion rate, predicted conversion rate, probability of a consumer purchasing the promotion, or relevance of the promotion to the consumer may be assigned to positions that are designated with higher levels of desirability. For instance, the promotion with the highest score may be assigned the position with the highest level of desirability at the top of the email. Conversely, the promotion with the lowest score may be assigned the position with the lowest level of desirability.

A promotion score may be calculated and assigned to a promotion in the promotion system 100 by a scoring model of the analytical model 104. The scoring model may be configured to predict the likelihood that the consumer will accept a promotion that is offered to the consumer independent of whether the consumer was previously presented with the same or similar promotion. The scoring model may score a promotion, for example, according to any one of the methods disclosed in U.S. patent application Ser. No. 13/411,502 and U.S. Provisional Patent Application No. 61/644,352, both of which are incorporated by reference herein in their entirety. Further, an example of a reimpression system is disclosed in U.S. Provisional Application No. 61/675,769 and in U.S. application Ser. No. 13/838,874, both of which are incorporated by reference herein in their entirety.

The analytical model 104 may also include one or more components for analyzing whether to include a promotion in an electronic correspondence based on, at least in part, previous presentation(s) of one or more the same or similar promotions to the consumer. Based on this analysis, the analytical model 104 may determine whether to include the promotion in the electronic correspondence. For instance, the analytical model 104 may apply a correction factor to the promotion's score based on the analysis of previous presentation(s) of the same or similar promotions to the consumer. The modified promotion score may then be referenced to determine whether to include the promotion in the electronic correspondence. Further description of this analysis is provided below.

Alternatively or in addition, the analytical model 104 may utilize the analysis in order to determine a position within an electronic correspondence to assign each promotion included in the electronic correspondence. For instance, the promotion may be selected for inclusion in the electronic correspondence, and the analysis of whether the same or similar promotions have been previously presented to the consumer may determine the position of the promotion within the electronic correspondence. Again, a correction factor may be generated and applied to the promotion's score based on the analysis of previous presentation(s) of the same or similar promotions to the consumer. The modified promotion score may then be referenced to adjust a position of the promotion within the electronic correspondence. Further description of this analysis is provided below.

The analytical model 104 communicates with one or more databases that are part of (or work in conjunction with) the promotion offering system 102 such as a promotion programs database 110, consumer profiles database 112, historical data database 114 and dynamic data database 116. The analytical model 104 may access the databases 110, 112, 114 and 116 in order to obtain performance data on the various promotions in the promotion system 100 that have been offered to consumers in the market, both in the past and currently.

The promotion programs database 110 is configured to store data detailing various promotions and promotion programs that are available for offer in the promotion offering system 102. In order to input promotion program information into the promotions program database 110, merchants may optionally communicate via the networks 122 with the promotion offering system 102 to input the information detailing the various promotion program offerings.

The consumer profiles database 112 includes profiles and sub-profiles for the consumers, consumer 1 (124) to consumer N (126), that are included in the promotion system 100. Each profile or sub-profile includes one or more consumer attributes that describe the consumer. The consumer attributes may include, but are not limited to, the consumer's name, consumer's age, consumer's location (such as the consumer's home address and/or the consumer's work address), consumer's occupation, consumer's educational background, consumer's previously accepted and/or rejected promotion program offerings, consumer's gender and the like.

The consumer may additionally select one or more specific consumer-focused deal types (DTs) for inclusion in the consumer's profile. The DTs may be defined in one of several ways. A discussion of DTs is included in U.S. Provisional Application No. 61/695,857, incorporated by reference herein in its entirety.

In one embodiment, DTs are defined as a taxonomy different from categories/subcategories. In particular, categories/subcategories are one type of taxonomy or classification, and DTs are another distinct type of taxonomy or classification.

In another embodiment, DTs are defined based on the structure of the taxonomy. For example, categories/subcategories may be defined as a hierarchy with multiple layers. More specifically, the categories/subcategories include at least two levels, one level defining categories and sub-level(s) defining the subcategories (e.g., one sub-level includes subcategories and a further sub-level includes sub-subcategories). In contrast, the DTs may be defined as a single layer without multiple levels. More specifically, the DTs may have a horizontal relationship with one another, but not a vertical relationship owing to the single layer hierarchy.

In still another embodiment, the DTs may be defined with respect to, or independent of, categories and/or subcategories. In one aspect, the definition of the DTs may be dependent on a category and/or subcategory. For example, one of the DTs may comprise "adrenaline". The DT for "adrenaline" may be defined based on a look-up table that correlates to particular subcategories, such as the subcategory "hot air balloons", the subcategory "skydiving", the subcategory "scuba diving", etc. In this way, the DTs may be defined based on multiple categories and/or subcategories. In another aspect, the definition of the DTs may be independent of category and/or subcategory. For example, the DTs may be manually assigned. In this way, the assignment of the DTs is not based on a direct correlation with categories or subcategories.

In yet another embodiment, the DTs may be based on one or more aspects of the consumer to which the DT is assigned. For example, one or more DTs may also be suggested to be associated with the consumer based on the consumer's past behavior within the promotion system 100. In this way, a DT is distinct from any one promotion category, and serves to define one or more aspects of the consumer. More particularly, the DT is indicative of one or more aspects of the consumer, whereas the categories/subcategories are indicative of one or more aspects of the merchant. For instance, a DT is indicative of a characteristic of the consumer, such as a description of a personality or trait of the consumer, a description of an interest or pursuit of the consumer, and/or a description of an activity or action of the consumer.

In still another embodiment, both the DTs and the categories/subcategories are defined based on the merchant, but defined based on different aspects of the merchant. As discussed above, for example, the category of the promotion may comprise a restaurant promotion, a spa promotion, a travel promotion, a local promotion, and the respective sub-category of the promotion may comprise a Japanese restaurant, a Massage promotion, a Caribbean cruise promotion, and a local farmer's market promotion. In contrast, the DTs may include "family friendly", which may comprise a "family friendly" restaurant, "family friendly" Japanese restaurant, etc. So that the DTs describe an aspect of the merchant which is separate from the category and/or sub-category description.

In yet another embodiment, the DTs are distinguished from categories/subcategories in their application and/or use. For example, the DTs may be assigned to a promotion in a different way from the assigning of the category/subcategory of the promotion. As another example, the DTs may be used in a different way from the category/subcategory in determining whether to present the promotion to the consumer. More specifically, the category/subcategory may be used in one step (such as the initial estimate of the probability of acceptance of the promotion) and the DTs may be used in another step (such as to determine a correction factor), as discussed in more detail below.

A DT may include, for example, a food interest group, outdoors interest group, home improvement interest group, children's related interest group, pampering and leisure interest group, pet enthusiast's interest group, healthy life style interest group, extreme sports interest group, traveling interest group, music and concert interest group and car enthusiast interest group among others. The examples given for DT are merely for illustration purposes. Other DTs are contemplated.

In order to use DTs for selecting promotions, the promotions may be assigned or associated with one or more DTs (such as by assigning a tag indicating an association to a corresponding DT). The promotion may be associated with a DT either automatically or manually. For example, the promotion offering system 102 may automatically assign a DT based on one or more attributes descriptive of the promotion and one or more attributes descriptive of the DT. More specifically, a promotion may be associated with a DT if the promotion shares one or more same, or similar, attributes as the DT. In this way, the promotion offering system 102 is able to tailor the presentation of promotions to the consumer by selecting promotions that are tagged with one or more DTs that match the DTs of the consumer, as described in more detail below.

The DTs that are selected by the consumer, or suggested by the promotion offering system 102, may be incorporated into the consumer's profile. The associated DT information from the consumer profile may then be referenced when determining one or more promotions to present to the consumer, as described below.

The historical data database 114 includes information detailing the past performance of promotion offerings that have been presented in the promotion offering system 102 in previous times. The historical data database 114 may include, but is not limited to, rates of acceptances of specific promotions and promotion programs, attributes of consumers that accepted or rejected specific promotion programs, times at which previous emails were reviewed by a consumer, and the like. The historical data database 114 may also include historical performance data for the promotions in the promotion system 100 that details revenue data in the form of gross profits, gross sales or net profits obtained from the purchase of promotions. Profits may be defined as a set amount that is received for each promotion that is purchased by a consumer, a percentage of the value of a deal that is being offered by a purchased promotion, a percentage of the amount a consumer spends when a promotion is purchased, or some other amount that is agreed upon with a merchant for a promotion that has been purchased. This historical performance data may then be referenced as part of an analysis executed by the analytical model 104 for determining a proposed portfolio of promotions taken from a mix of promotion categories.

The dynamic data database 116 includes information detailing the past performance of a promotion program offering that is currently active in the promotion offering system 102. So that, while a promotion program referenced in the dynamic data database 116 is currently active, the data stored in the dynamic data database 116 may pertain to include performance data of the active promotion program from a previous time period.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

Any one or more of the databases 110, 112, 114, 116 may also include a repository of deals, such as disclosed in U.S. application Ser. No. 13/460,745, incorporated by reference in its entirety. The repository of deals includes one or more promotions that may be available for selection to present to a consumer. When compared to the other promotions in the promotion programs database 110, the promotions in the repository of deals may be available for a prolonged period of time. For instance, whereas other promotions may typically have a shelf life of 2 months before expiring, promotions in the repository of deals may be allowed to be available until a merchant expressly notifies the promotion system 100 to cease offering the promotion. In this way, even though a particular type of promotion may not be found in the rest of the promotion inventory found in promotion programs database 110, the promotion system 100 may rely on the repository of deals to consistently have a collection of promotions from which to select from. In some embodiments, the repository of deals may be stored in any one of the other databases 112, 114, 116, or alternatively stored as part of a separate database not illustrated.

In some embodiments, a promotion in the promotion inventory database 110 may be part of a first repository of deals and featured during an initial feature period. As part of the first repository of deals, the promotion may be publicly available for selection and presentation to a consumer in the promotion system 100 during the initial feature period. After the initial feature period passes, the promotion may be included as part of a second repository of deals. However, not all promotions that pass their initial feature period need be selected for inclusion in the second repository of deals. In one embodiment, the deals that are included in the second repository of deals are not publicly available by some (or all) of the consumers.

In selecting a deal to present to the consumer, the analytical model 104 may first examine deals from the first repository of deals (which are currently in the initial period). In the event that a score associated with a deal in the first repository is sufficient to present to the consumer, the analytical model 104 may select the deal for presentation. However, in the event that the analytical model 104 does not find a deal in the first deal repository (e.g., the score for the deals in the first deal repository is below a predetermined threshold), the analytical model 104 may examine deals in the second deal repository. In this way the second repository of deals offers a supplemental inventory of promotions from which the promotion offering system 102 may select promotions for presentation to a consumer.

In some embodiments, the repository of deals may be comprised of multiple deal repositories. For instance, a first repository of deals may include promotions that are offered to consumers for a shorter period of time (such as up to 1 week) and a second repository of deals may include promotions that are offered to consumers for a longer period of time (such as up to 6 months). In some embodiments, the second repository of deals may be stored in any one of the other databases 112, 114, 116, or alternatively stored as part of a separate database not illustrated.

Figure 2A:
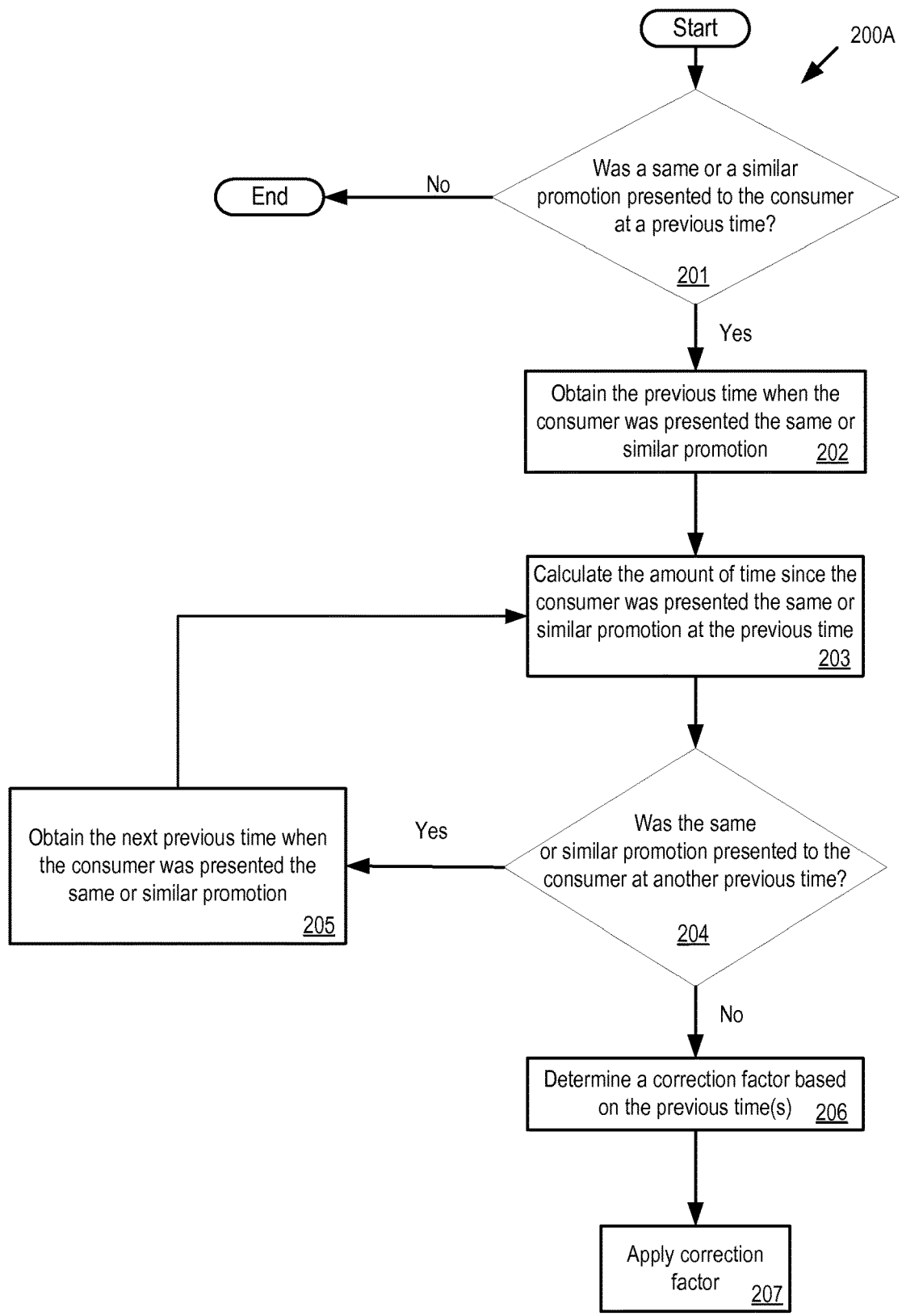
FIG. 2A illustrates a flow chart describing a process for accounting for a previous presentation of a same or similar promotion to a consumer when determining a selection of promotions for a subsequent presentation of one or more promotions to the consumer, according to some embodiments.

FIG. 2A illustrates a flow chart 200A describing an overview of a process for presenting a consumer with a diverse mix of promotions by reducing the number of same, or similar, promotions that are presented to the consumer according to a first embodiment. The process described by flow chart 200A is provided from the standpoint of selecting promotions for inclusion into a current contemplated email, and analyzing whether a same or similar promotion was previously presented to the consumer. If a same or similar promotion was previously presented to the consumer, then a correction factor is calculated that may be applied when determining whether to include the same or similar promotion in the contemplated email. Likewise, the process described in flow chart 200A may be applied to determine whether to include the promotion in any electronic correspondence, such as responsive to a search request from a consumer for promotions from the promotion programs database 110.

At 201, it is determined whether a same or similar promotion as the contemplated promotion being analyzed for inclusion in the contemplated email has been presented to the consumer at a previous time. If the same or similar promotion has not been previously presented to the consumer, then the analysis ends and a correction factor is not accessed.

A promotion may be considered to be similar to the contemplated promotion if it belongs to a same promotion category, sub-category, or other definable promotion attribute as described above.

In addition or alternatively, a promotion may be considered to be similar to the contemplated promotion if it is associated with a same DT as the contemplated promotion.

In addition or alternatively, a promotion may be considered to be similar to the contemplated promotion if it is offered by the same merchant as the contemplated promotion.

In addition or alternatively, a promotion may be considered to be similar to the contemplated promotion if it belongs within a same value range. For example, promotions that belong to a same value range may be identified as belonging to a same value range promotion category, such that each defined promotion value range corresponds to respective promotion category. A description of promotion value ranges is provided, for example, with reference to Table 4 in FIG. 4. Table 4 illustrates promotion value ranges (e.g., promotion categories) existing for promotions that are in the value range of less than $15, between $15-$30, between $31-$50, between $51-$100, between $101-$150, between $151-$200, and the value range of between $201-$300. The value ranges illustrated in Table 4 are provided for exemplary purposes only. Other promotion categories that correspond to promotions that belong in other value ranges are contemplated. The value range of the promotion category may relate to a purchase price of the promotion, an amount of discount offered by the promotion, or an amount of revenue receivable by the promotion system 100 or merchant when the promotion is purchased by a consumer. The methods for determining a similar promotion is provided for exemplary purposes only, as other methods are contemplated.

In some embodiments, the contemplated promotion may automatically be selected for inclusion in the contemplated email if a same or similar promotion is determined never to have been previously presented to the consumer. In addition or alternatively, the contemplated promotion may automatically be refrained from inclusion in the electronic correspondence if it is determined that a same or similar promotion has been previously presented to the consumer. In addition or alternatively, the contemplated promotion may automatically be refrained from inclusion in the electronic correspondence if it is determined that a same or similar promotion has been previously presented to the consumer within a set amount of time.

If it is determined at 201 that a same or similar promotion was previously presented to the consumer, then at 202 the previous time at which the consumer was presented the same or similar promotion is obtained. The previous time may be referenced as a particular date, time of day (e.g. morning, afternoon or night) or other similar measure of a time.

In some embodiments, a status of the consumer during the previous presentation of the same or similar promotion may be referenced. For instance, if the consumer is determined to have had an inactive status at the previous time when the same or similar promotion was presented to the consumer, then the previous time may be ignored. In other words, the analytical model 104 may not consider the previous presentation of a same or similar promotion to have occurred during times when the consumer is determined to have had an inactive status. In this way, even though the consumer was previously presented with a same or similar promotion, because the consumer was inactive at the previous time, this previous presentation may be ignored. The inactive status may refer to a time, or time period, during which the consumer has not purchased a promotion from the promotion system 100, has not opened an electronic correspondence (e.g., email) transmitted by the promotion offering system 102, has not visited or viewed a webpage of the promotion system 100, has not logged into an electronic correspondence (e.g., webpage or webpage portal) of the promotion system 100, has not clicked on a promotion that is displayed on a webpage of the promotion system 102, has not hovered a mouse point (or similar user input device) over a section of a webpage (e.g., over a promotion in order to obtain information regarding the promotion) of the promotion system 100, or any other similar measure of inactivity with the promotion system 100. If the consumer is determined to have been in an inactive status at the previous time, the process may end or alternatively return to 201.

After the previous time information is obtained at 202, at 203 an amount of time since the consumer was presented the contemplated promotion at the previous time is calculated. The amount of time may be a difference between the current time for presenting the contemplated email and the obtained previous time. The amount of time may be measured according to a number of hours, days, weeks, months or other similar units of time. For exemplary purposes, the amount of time may be two days such that two days have passed since the contemplated promotion has been presented to the consumer.

In some embodiments, after 203, it may be determined whether the amount of time is greater than a first predetermined amount (not illustrated). If the amount of time calculated at 203 is greater than the first predetermined amount, then the analysis ends and a correction factor is not generated, or a correction factor having no effect may be generated (e.g. the correction factor is a multiplier equal to 1.0). Thus the promotion may be included in the electronic correspondence even though a similar promotion was previously presented to the consumer, if the previous presentation of the similar promotion occurred longer than the first predetermined amount of time ago. In such embodiments, the promotion offering system 102 is configured such that the previous presentation of the same or similar promotion that occurred more than the first predetermined amount of time ago, is considered not to have an effect on the consumer currently. For instance, the first predetermined amount of time may be long enough such that any negative impact of presenting the same or similar promotion to the consumer may have dissipated. It may be assumed that the consumer has forgotten about the previous presentation of the same or similar promotion that took place more than the first predetermined amount of time ago.

In addition or alternatively, the promotion offering system 102 may be configured to assume that the consumer will be receptive once more to receive the same or similar promotion after the first predetermined amount of time has passed.

In some embodiments the first predetermined amount of time may be the same across all categories, sub-categories and promotions associated to the same DT. In other embodiments, each category, sub-category and DT may have its own first predetermined amount of time corresponding to it. For example, the first predetermined amount of time corresponding to the subsequent presentation of promotions from a same restaurant promotion category may be shorter when compared to the first predetermined time corresponding to the subsequent presentation of promotions from a same merchandise promotion category. This would indicate that consumers are more likely to accept restaurant promotions that are presented in shorter intervals than they are merchandise promotions. In these embodiments, the promotion offering system 102 contemplates that the time it takes for the consumer to forget, or not be affected by, the previous presentation of a same or similar promotion will vary depending on whether the previous promotion is similar based on a same promotion category, sub-category or DT.

In some embodiments, after 203, it may be determined whether the amount of time is less than a second predetermined amount of time (not illustrated). If the amount of time calculated at 203 is less than the second predetermined amount, then the analysis ends and a correction factor is not generated, or a correction factor that will result in the promotion not being included in the electronic correspondence is assigned (e.g., the correction factor is a multiplier equal to 0.0). Thus the promotion will not be included in the electronic correspondence if the previous presentation of the similar promotion occurred less than the second predetermined amount of time ago. In such embodiments, the promotion offering system 102 is configured such that the consumer is assumed not to be receptive of receiving similar promotion offerings less than the second predetermined amount of time apart. Past performance data (either specific to the consumer or general for all consumers) may indicate that the consumer rarely, or never, accepted similar promotions that were presented to the consumer within the second predetermined amount of time. Each promotion category, sub-category or DT may be associated with a same or different second predetermined amount of time. In this way, by determining a second predetermined amount of time, the promotion offering system 102 can determine the minimum time period between presenting a consumer with a similar promotion.

In some embodiments, the second predetermined amount of time may be determined for a certain promotion category, based on the past performance of promotions from sub-categories of the certain promotion category. For instance, the past performance data may indicate that promotions belonging to sub-categories of a first promotion category performed at an acceptable level within an x amount of time. The past performance data may also indicate that promotions belonging to sub-categories of a second promotion category performed at an acceptable level within a y amount of time. The x amount of time may be less than the y amount of time. Under these exemplary circumstances, the second predetermined amount of time associated with the first promotion category may be shorter than the second predetermined amount of time associated with the second promotion category. In this way, a promotion that is similar to a previously presented promotion by way of sharing the same first promotion category may be presented to the consumer in a shorter amount of time than if the promotion is similar to a previously presented promotion by way of sharing the same second promotion category.

At 204, a determination is made as to whether another same or similar promotion as the contemplated promotion has been presented to the consumer at another previous time. If it is determined that another same or similar promotion was offered to the consumer at another previous time, this next previous time is obtained at 205. Following 205, the amount of time since the consumer was presented the other same or similar promotion is calculated at 203.

When it is determined at 204 that there are no remaining previous times at which another same or similar promotion was presented to the consumer, the process moves to 206. At 206, all of the previous times at which a same or similar promotion as the contemplated promotion was presented to the consumer are considered when determining correction factor(s) for the contemplated promotion.

At 207 the correction factor may be applied to a score of contemplated promotion to calculate an updated score of the contemplated promotion. In this way, the updated score may be referenced when determining whether to select the contemplated promotion for inclusion in the current contemplated email. Further description of this is provided with reference to FIG. 3.

For example, in some embodiments the correction factor may be determined by referencing a look-up table including one or more correction factors. Each correction factor stored in the look-up table may correspond to an amount of time such that the appropriate correction factor determined at 206 may be located in the look-up table by using the calculated amount of time from 203. The look-up table may, for example, be stored in any one of the databases 110, 112, 114, and 116 described above.

In some embodiments, the correction factor may be determined at 206 by generating the correction factor based on the amount of time calculated at 203. For example, as the amount of time since the previous presentation of a similar promotion grows longer, the correction factor may be generated to have a value that will have less of an impact on the promotion score (e.g., the correction value has a lower or higher value depending on if the correction value is a standalone value or percentage value, respectively). So that, as the amount of time that passes since the previous presentation of the similar promotion increases, the correction factor may be generated to have a value that will impact the promotion score less. The correction factor that is applied to the promotion score at 207 may have a lower impact on the promotion score by being a higher percentage value, thus maintaining more of the promotion score value after applying the correction factor. The correction factor may also be applied as a standalone value to the promotion score, such that a lower correction factor value will have a lower impact on the promotion score.

Figure 2B:
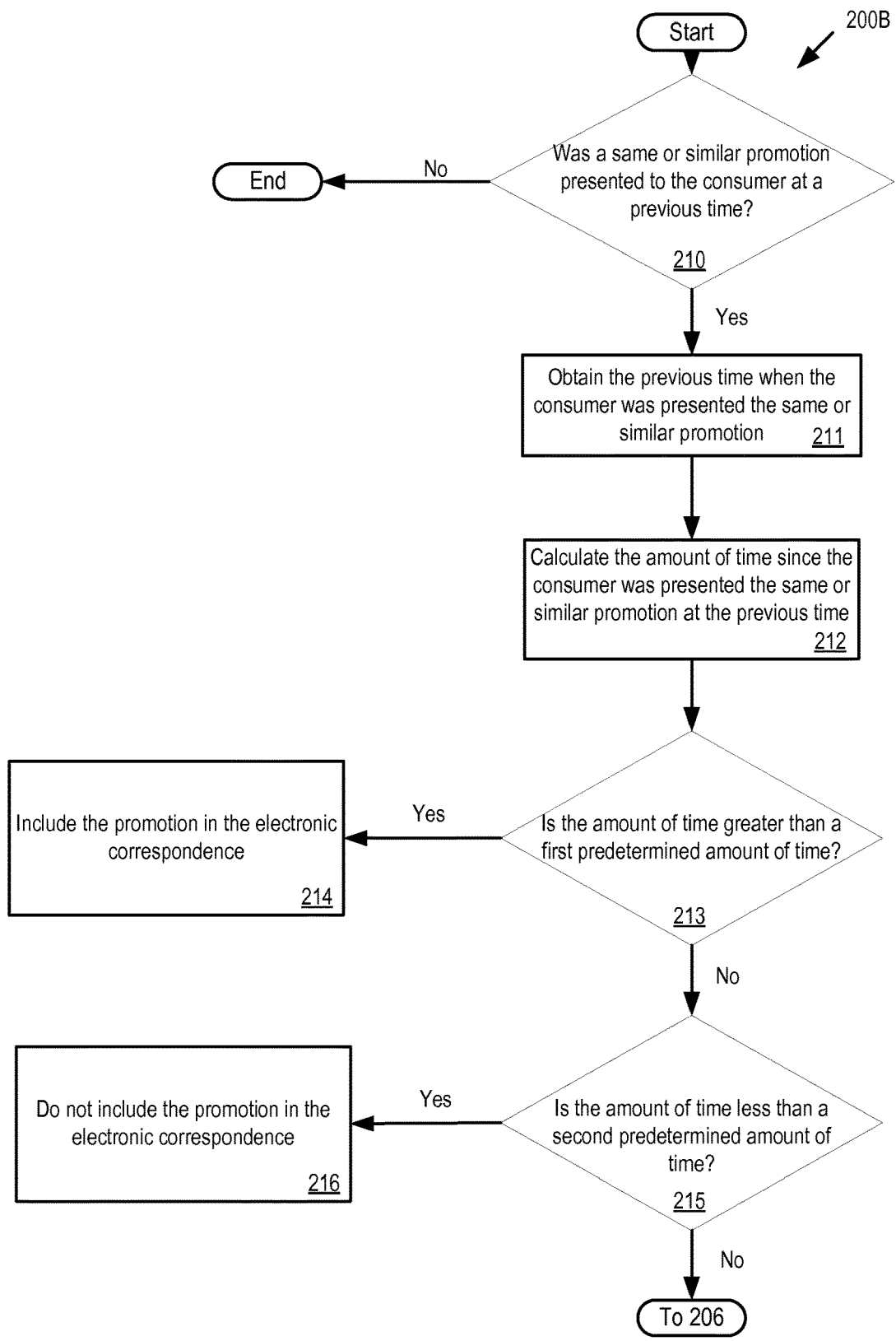
FIG. 2B illustrates a flow chart describing a process for accounting for a previous presentation of a same or similar promotion to a consumer when determining a selection of promotions for a subsequent presentation of one or more promotions to the consumer, according to some embodiments.

FIG. 2B illustrates a flow chart 200B describing an overview of a process for presenting a consumer with a diverse mix of promotions by reducing the number of same, or similar, promotions that are presented to the consumer according to an alternate embodiment. The process described by flow chart 200B is provided from the standpoint of selecting promotions for inclusion into a current contemplated email, and analyzing whether a same or similar promotion was previously presented to the consumer. If a same or similar promotion was previously presented to the consumer, then a correction factor is calculated that may be applied when determining whether to include the same or similar promotion in the contemplated email. Likewise, the process described in flow chart 200A may be applied to determine whether to include the promotion in any electronic correspondence, such as responsive to a search request from a consumer for promotions from the promotion programs database 110.

At 210, it is determined whether a same or similar promotion as the contemplated promotion being analyzed for inclusion in the contemplated email has been previously presented to the consumer at a previous time. If the same or similar promotion has not been previously presented to the consumer, then the analysis ends and a correction factor is not accessed. A promotion may be considered to be similar to the contemplated promotion if it belongs to a same promotion category or sub-category.

In addition or alternatively, a promotion may be considered to be similar to the contemplated promotion if it is associated with a same DT as the contemplated promotion.

In addition or alternatively, a promotion may be considered to be similar to the contemplated promotion if it is offered by the same merchant as the contemplated promotion.

In addition or alternatively, a promotion may be considered to be similar to the contemplated promotion if it belongs within a same value range, as described above. The methods for determining a similar promotion is provided for exemplary purposes only, as other methods are contemplated.

In some embodiments, the contemplated promotion may automatically be selected for inclusion in the contemplated email if a same or similar promotion is determined never to have been previously presented to the consumer. In addition or alternatively, the contemplated promotion may automatically be refrained from inclusion in the electronic correspondence if it is determined that a same or similar promotion has been previously presented to the consumer. In addition or alternatively, the contemplated promotion may automatically be refrained from inclusion in the electronic correspondence if it is determined that a same or similar promotion has been previously presented to the consumer within a set amount of time.

If it is determined at 210 that a same or similar promotion was previously presented to the consumer, then at 211 the previous time at which the consumer was presented the same or similar promotion is obtained. The previous time may be referenced as a particular date, time of day (e.g. morning, afternoon or night) or other similar measure of a time.

In some embodiments, a status of the consumer during the previous presentation of the same or similar promotion may be referenced. For instance, if the consumer is determined to have had an inactive status at the previous time when the same or similar promotion was presented to the consumer, then the previous time may be ignored. In other words, the analytical model 104 may not consider a previous presentation of a same or similar promotion to have occurred during times when the consumer is determined to have had an inactive status. In this way, even though the consumer was previously presented with a same or similar promotion, because the consumer was inactive at the previous time this previous presentation may be ignored. The inactive status may refer to a time, or time period, during which a consumer has not purchased a promotion from the promotion system 100, has not opened an electronic correspondence (e.g., email) transmitted by the promotion offering system 102, has not visited or viewed an electronic correspondence (e.g., webpage) of the promotion system 100, has not logged into an electronic correspondence (e.g., webpage or webpage portal) of the promotion system 100, has not clicked on a promotion that is displayed on a webpage of the promotion system 102, has not hovered a mouse point (or similar user input device) over a section of a webpage (e.g., over a promotion in order to obtain information regarding the promotion) of the promotion system 100, or any other similar measure of inactivity with the promotion system 100. If the consumer is determined to have been in an inactive status at the previous time, the process may end or alternatively return to 210.

After the previous time information is obtained at 211, at 212 an amount of time since the consumer was presented the contemplated promotion at the previous time is calculated. The amount of time may be a difference between the current time for presenting the contemplated email and the obtained previous time. The amount of time may be measured according to a number of hours, days, weeks, months or other similar units of time. For example, the amount of time may be two days such that two days have passed since the contemplated promotion has been presented to the consumer.

At 213, it is determined whether the amount of time is greater than a first predetermined amount. If the amount of time calculated at 203 is greater than the first predetermined amount, then the promotion is included in the electronic correspondence at 214. The promotion is included in the electronic correspondence even though a similar promotion was previously presented to the consumer, if the previous presentation of the similar promotion occurred longer than the first predetermined amount of time ago. The promotion offering system 102 is configured such that the previous presentation of the same or similar promotion that occurred more than the first predetermined amount of time ago may be considered not to have an effect on the consumer currently. For instance, the first predetermine amount of time may be long enough such that any negative impact for presenting the same or similar promotion to the consumer may have passed. It may be assumed that the consumer has forgotten about the previous presentation of the same or similar promotion that took place more than the first predetermined amount of time ago.

In addition or alternatively, the promotion offering system 102 may be configured to assume that the consumer will be receptive once more to receive the same or similar promotion after the first predetermined amount of time has passed.

In some embodiments the first predetermined amount of time may be the same across all categories, sub-categories and promotions associated to the same DT. In other embodiments, each category, sub-category and DT may have its own first predetermined amount of time corresponding to it. For example, the first predetermined amount of time corresponding to the subsequent presentation of promotions from a same restaurant promotion category may be shorter when compared to the first predetermined time corresponding to the subsequent presentation of promotions from a same merchandise promotion category. This would indicate that consumers are more likely to accept restaurant promotions that are presented in shorter intervals than they are merchandise promotions. In these embodiments, the promotion offering system 102 contemplates that the time it takes for the consumer to recover from the previous presentation of a same or similar promotion will vary depending on the whether the previous promotion is similar based on a same promotion category, sub-category or DT.

The first predetermined amount of time may be generated based on historical performance data. The performance data may be for all promotions historically in the promotion system 100. In addition or alternatively, the performance data may be further specified to be accessed from promotions sharing a same promotion category, sub-category, DT or other definable promotion attribute as the promotion being considered for inclusion in the electronic correspondence. In addition or alternatively, the performance data may be further specified to be accessed from those promotions that belong to sub-categories associated to the promotion category of the promotion currently being considered for inclusion in the electronic correspondence.

The actual performance data that is accessed may identify an amount of time that passes between a same, or similar, promotion being purchased by a consumer in the promotion system 100.

The time information may then be averaged to generate the first predetermined amount of time. In addition or alternatively, the first predetermined amount of time may be generated to be a median of the accessed times. In addition or alternatively, the first predetermined amount of time may be generated to be a local maximum of the accessed times, such that the first predetermined amount of time is equal to the longest amount of time between a same or similar promotion being purchased by a consumer. In addition or alternatively, the first predetermined amount of time may be generated to be a local minimum of the accessed times, such that the first predetermined amount of time is equal to the shortest amount of time between a same or similar promotion being purchased by a consumer. In addition or alternatively, the first predetermined amount of time may be generated to identify a time amount that passes between the presentations of same or similar promotions before the performance of the subsequent presentation of the same or similar promotion surpasses a certain threshold. The performance may be measured as a rate of purchases of subsequent promotions, revenue earned from the purchase of subsequent promotions, and other similar methods for defining the performance of presenting promotions to consumers in the promotion system 100. The methods provided for generating the first predetermined amount of time is provided for exemplary purposes only. Other methods are contemplated.

If the amount of time is not greater than the first predetermined amount of time, then at 215 it is determined whether the amount of time is less than a second predetermined amount of time. If the amount of time calculated at 212 is less than the second predetermined amount, then the promotion is not included in the electronic correspondence at 216. Thus the promotion will not be included in the electronic correspondence if the previous presentation of the similar promotion occurred less than the second predetermined amount of time ago. The promotion offering system 102 is configured such that the consumer may be assumed not to be receptive of receiving similar promotion offerings less than the second predetermined amount of time apart.

The second predetermined amount of time may be generated based on historical performance data. The performance data may be for all promotions historically in the promotion system 100.

In addition or alternatively, the performance data may be further specified to be accessed from promotions sharing a same promotion category, sub-category, DT or other definable promotion attribute as the promotion being considered for inclusion in the electronic correspondence. In this way, each promotion category, sub-category or DT may be associated with a same or different second predetermined amount of time.

In addition or alternatively, the performance data may be further specified to be accessed from those promotions that belong to sub-categories associated to the promotion category of the promotion currently being considered for inclusion in the electronic correspondence.

The actual performance data that is accessed may identify an amount of time that passes between a same, or similar, promotion being purchased by a consumer in the promotion system 100.

The time information may then be averaged to generate the second predetermined amount of time. In addition or alternatively, the second predetermined amount of time may be generated to be a median of the accessed times. In addition or alternatively, the second predetermined amount of time may be generated to be a local maximum of the accessed times, such that the second predetermined amount of time is equal to the longest amount of time between a same or similar promotion being purchased by a consumer. In addition or alternatively, the second predetermined amount of time may be generated to be a local minimum of the accessed times, such that the second predetermined amount of time is equal to the shortest amount of time between a same or similar promotion being purchased by a consumer. In addition or alternatively, the second predetermined amount of time may be generated to identify a time amount that passes between the presentations of same or similar promotions before the performance of the subsequent presentation of the same or similar promotion surpasses a certain threshold. The performance may be measured as a rate of purchases of subsequent promotions, revenue earned from the purchase of subsequent promotions, and other similar methods for defining the performance of presenting promotions to consumers in the promotion system 100. The methods provided for generating the second predetermined amount of time is provided for exemplary purposes only. Other methods are contemplated.

In some embodiments, the second predetermined amount of time may be determined for a certain promotion category, based on the past performance of promotions from sub-categories of the certain promotion category. For instance, the past performance data may indicate that promotions belonging to sub-categories of a first promotion category performed at an acceptable level within an x amount of time. The past performance data may also indicate that promotions belonging to sub-categories of a second promotion category performed at an acceptable level within a y amount of time. The x amount of time may be less than the y amount of time. Under these exemplary circumstances, the second predetermined amount of time associated with the first promotion category may be shorter than the second predetermined amount of time associated with the second promotion category. In this way, a promotion that is similar to a previously presented promotion by way of sharing the same first promotion category may be presented to the consumer in a shorter amount of time than if the promotion is similar to a previously presented promotion by way of sharing the same second promotion category.

In this way, the second predetermined amount of time may be a representation of a minimum time period between presenting a consumer with a similar promotion in order to obtain an acceptable level of performance.

If the amount of time is determined not to be less than the second predetermined amount of time at 215, then the process described by flow chart 200B may proceed to, for example, 206 illustrated in FIG. 2A.

Figure 2C:
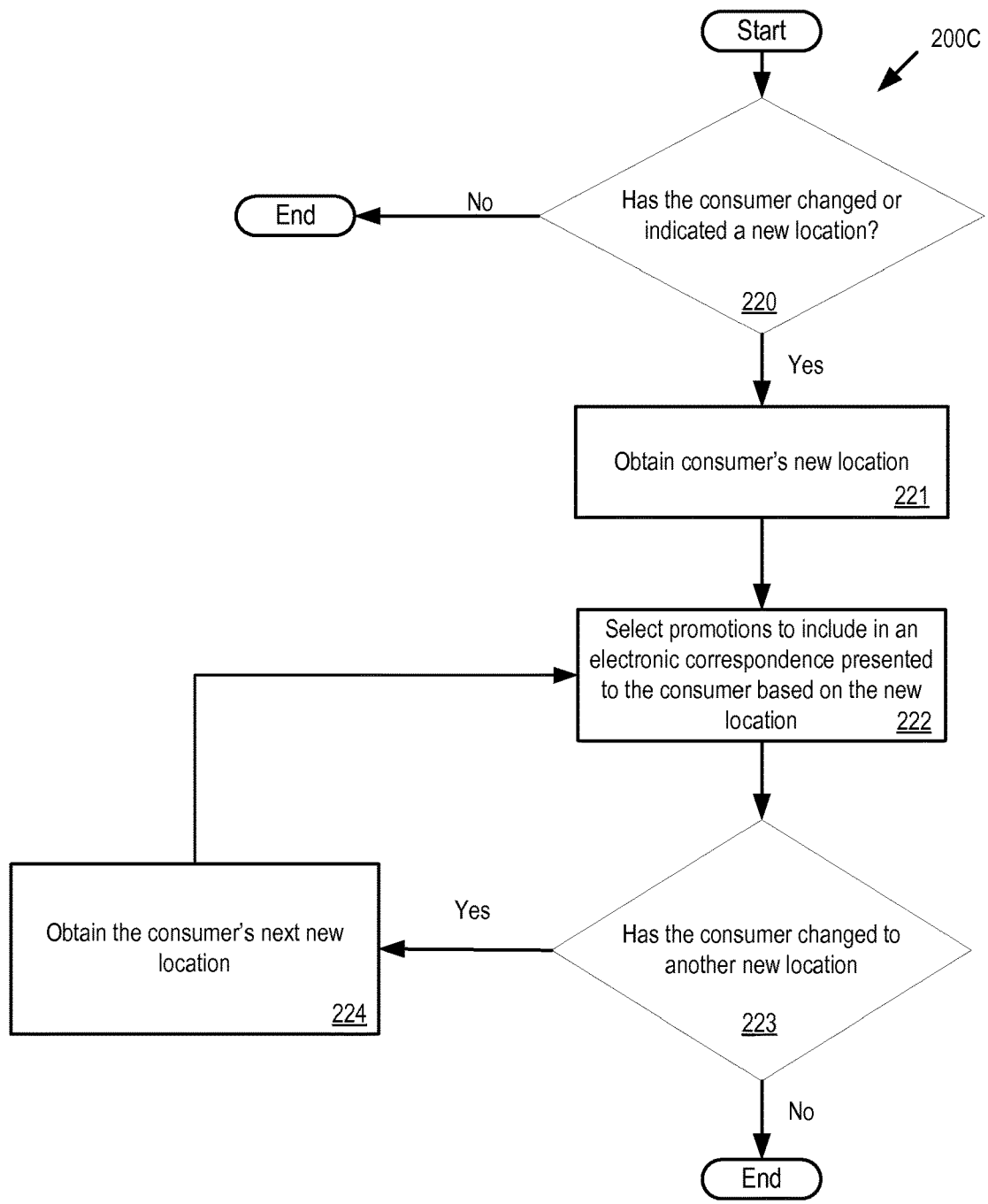
FIG. 2C illustrates a flow chart describing a process for adjusting promotions that may be presented to a consumer based on the consumer's new location, according to some embodiments.

FIG. 2C illustrates a flow chart 200C describing an overview of a process for determining whether a consumer has changed a location, and adjusting the generation of promotions for future presentation to the consumer accordingly. For example, the consumer may update the consumer's profile to include a new consumer location, or to update a default consumer location with a new default consumer location. The new consumer location may then be referenced when selecting promotions for inclusion in a future electronic correspondence to be presented to the consumer.

As another example, the consumer may be interacting with a search protocol on a webpage of the promotion system 100, and the consumer may indicate in the consumer's search criteria input that the search results are to consider a specific location. Therefore promotions in the search results that are found to be related to the specific location may then be given a higher search result placement (e.g., placed higher in the list of promotions from the search results). The closer a promotion from the search results is found to be located to the specific location, the higher up the promotion may be featured amongst the promotions in the search results.

As another example, the consumer may be interacting with a search protocol on a webpage of the promotion system 100, and the search results to the consumer's search criteria input may consider a location identified in the consumer's profile (e.g., default location or other location of interest identified in the consumer's profile). Therefore promotions in the search results that are found to be related to a location identified in the consumer's profile may then be given a higher search result placement (e.g., placed higher in the list of promotions from the search results). The more locations identified in the consumer's profile that a promotion from the search results is found to be related to may result in the promotion being featured higher up amongst the promotions in the search results.

According to another example, the promotion offering system 102 may identify a consumer's new location by identifying an IP address from which the consumer is accessing the promotion system.

In at least these ways, the process described by flow chart 200C may be understood to be taken from the standpoint of the promotion offering system identifying a location of interest of the consumer, and adjusting a future presentation of promotions based on the identified location of interest. The process described by flow chart 200C may also be understood to be taken from the standpoint of the consumer interacting with a search protocol on a webpage of the promotion system 100, where one of the inputs into a search request on the search protocol may include a location of interest of the consumer.

At 220, it is determined whether the consumer has changed or indicated a new location. According to a first embodiment, the consumer's location may have changed based on the consumer identifying in the consumer's profile that the consumer's location has changed to a new location, where the new location may replace a default location. In addition or alternatively, the consumer may identify an additional new location of interest in the consumer's profile.

According to a second embodiment, the new location may be input as part of the consumer's search criteria input on a search protocol of, for example, a webpage associated with the promotion system 100. For example, the consumer may input search criteria searching for a promotion, where the search criteria additionally includes a location criteria requesting search results that are within a set distance from the new location. In addition, the consumer may input search criteria that includes a location criteria requesting search results that are related to the new location. For example, the consumer may input search criteria requesting restaurant promotions that are related to a tropical vacation location (e.g., Thailand) of interest to the consumer. The search results may then additionally be focused on Thailand, such as returning Thai food restaurants, promotions that are available in Thailand, and travel promotions to Thailand.

According to a third embodiment, the new location may be identified by the promotion offering system 102 based on, for example, an IP address of the device from which the consumer accesses the promotion system 100. The consumer's location when accessing the promotion system may also be obtained via other similar IP geolocation technology that utilizes the network(s) 122.

The methods for determining a new location for the consumer is provided for exemplary purposes only, other methods are contemplated.

If there is no new location detected at 220, the process ends. However, if a new location for the consumer is detected at 220, then at 221 the new location is obtained at 221.

At 222, the new location for the consumer is referenced in order to select promotions that will be included in an electronic correspondence to be presented to the consumer.

According to the first and third embodiments, in cases where the electronic correspondence is of a type that is generated by the promotion offering system 102 (e.g., email, SMS message) and not requested by the consumer (e.g., presentation of search results from the consumer's search criteria input into a search protocol on a webpage associated with the promotion system 100), the inventory of promotions from which the analytical model 104 selects one or more promotions to include in the electronic correspondence may be limited to promotions that are within a set distance from the new location determined at 220, or promotions that are otherwise related to the new location determined at 220. For example, if the new location is a known vacation location, the inventory of promotions from which the analytical model 104 will reference when selecting promotions for the electronic correspondence to be presented to the consumer may be related to promotions that are related to vacations. This may include promotions from a merchandise goods promotion category, where the merchandise goods are related to the vacation location (e.g., suntan lotion and swimwear if the vacation location is a tropical warm weather vacation location, and ski-wear and snowboards if the vacation location is a winter cold weather location).

Also according to the first and third embodiments, the new location determined at 220 may be referenced by the analytical model 104 in the case where the electronic correspondence is a search result presentation to the consumer that utilizes a search protocol on a webpage of the promotion system 100. For instance, the new location in the consumer's profile may be implicitly referenced by the analytical model 104 when generating a search result presentation to the consumer's search input. So unlike the third embodiment where the consumer expressly inputs the new location of interest into the search protocol, according to the first and third embodiments, the new location of the consumer may be referenced by the analytical model 104 regardless of whether the consumer expressly inputs the new location as part of the search input criteria. For example if the consumer inputs a search criteria searching for a restaurant promotion, the analytical model 104 may additionally focus the search results on restaurants that are within a set location from the new location that is determined at 220 via the consumer's profile or via IP address lookup. The analytical model 104 may, for example, also additionally focus the search results for the consumer's search criteria for a restaurant to focus on restaurants that are related to the new location. For instance, if the new location is located in China, the search results may be focused on Chinese restaurants, that may or may not be located within a set distance from the new location or another location associated with the consumer.

According to the second embodiment, the search results that are presented to the consumer in response to the consumer's search criteria may be selected from an inventory of promotions that is limited to promotions that are within a set distance from the new location determined at 220, or promotions that are otherwise related to the new location determined at 220. For example, if the consumer's search criteria is a search for a restaurant, and the new location is a known vacation location, the analytical model 104 may present search results that are focused on promotions that are related to vacations. This may include promotions from a merchandise goods promotion category, where the merchandise goods are related to the vacation location (e.g., suntan lotion and swimwear if the vacation location is a tropical warm weather vacation location, and ski-wear and snowboards if the vacation location is a winter cold weather location). In addition or alternatively, the search results may be arranged such that promotions from the search results that are closer to the new location are featured higher than promotions from the search results that are further away from the new location. In addition or alternatively, the search results may be arranged such that promotions from the search results that are related to the new location are featured higher than promotions that are not related to the new location.

At 223, a determination is made as to whether the consumer has another new location that can be referenced. The new location may be indicated by the consumer or determined by the promotion offering system 102, as described above.

If the consumer is determined to have another new location for consideration at 223, then the consumer's new location is obtained at 224. And the process at 222 is repeated for the consumer's new location obtained at 224.

Figure 3:
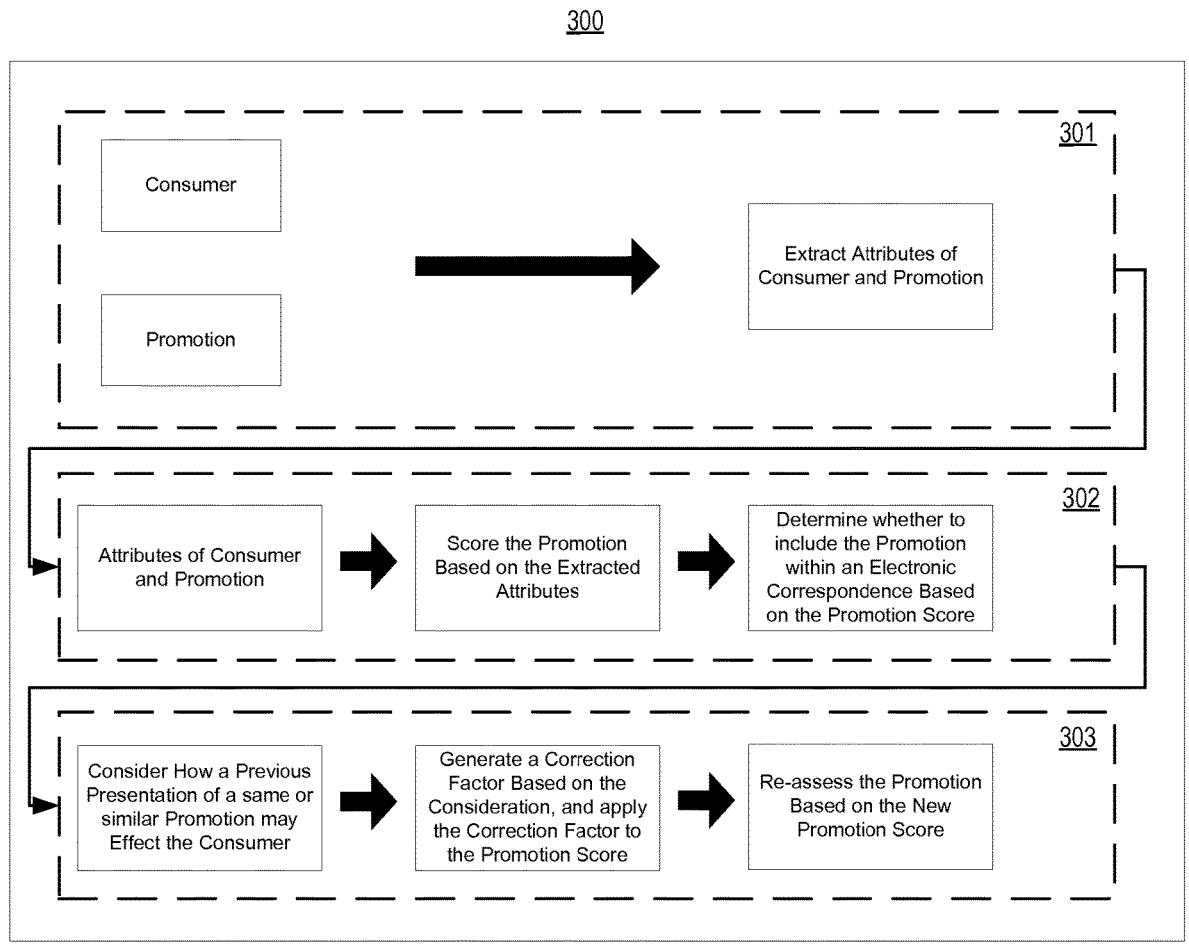
FIG. 3 illustrates a flow diagram describing an overview of a process for determining whether to include a promotion in an electronic correspondence based on a previous presentation of a same or similar promotion.

FIG. 3 illustrates flow diagram 300 describing an overview of a process for determining whether to include a contemplated promotion within a contemplated email based on the correction factor calculated from the process described by flow chart 300.

At 301, a contemplated promotion and a contemplated consumer for receiving the contemplated promotion are selected. Attributes of the contemplated consumer and the contemplated promotion are extracted. Examples of consumer attributes and promotion attributes, which are not exhaustive, are provided throughout this description.

At 302, the extracted attributes of the contemplated consumer and the contemplated promotion are used in order to score the contemplated promotion. The score for the contemplated promotion may be an indication of a probability the contemplated consumer will purchase the contemplated promotion. Once the contemplated promotion is scored, a determination may be made as to whether to include the contemplated promotion in the contemplated email. This determination may be made based on an analysis comparing the score of the contemplated promotion against the scores for other promotions included in the contemplated email. If the score indicates that the contemplated promotion is one of the top promotions amongst a set number of promotions that are to be included in the contemplated email, the contemplated promotion may be included in the contemplated email. Alternatively, the contemplated promotion may be included in the contemplated email if the contemplated promotion's score is greater than a set value. In some embodiments, if the contemplated promotion is found to be similar to a promotion already included in the contemplated email, only the promotion with the higher score will be included.

At 303, an analysis that considers how a previous presentation of a same or similar promotion as the contemplated promotion is processed. This analysis may be described by flow chart 300 described previously. From this analysis, a correction factor may be accessed. The correction factor may then be applied to the score of the contemplated promotion obtained prior at 302. After the correction factor is applied to the score of the contemplated promotion, a new updated promotion score of the contemplated promotion is obtained. Based on this updated score, the determination of whether to include the contemplated promotion in the contemplated email may be reassessed. For instance, if the correction factor brings the score of the contemplated promotion down, the contemplated promotion may lose its spot in the contemplated email. Conversely, if the correction factor brings the score of the contemplated promotion up, the contemplated promotion may gain a spot in the contemplated email.

Although not specifically illustrated in flow chart 300, an optional analysis may be added following the application of the correction factor(s), or at any time following the generation of the correction factor(s). This optional analysis applies an added penalty to the correction factor(s) generated during the process described in flow 300. The added penalty is applied to account for the assumption that consumers become more receptive to purchasing promotions as the time between the presentations of a same or similar promotion increases. In this way, the penalty will decrease as the time between presentations of the same or similar promotion increases. The penalty may be applied either to the correction factor calculated during the process illustrated by flow chart 300, or the penalty may be applied to generate a new adjusted score for the contemplated promotion at 303.

The present disclosure describes presenting an electronic correspondence that includes one or more promotions to the consumer across a plurality of different communication channels. For example, the electronic correspondence may be in the form of an email that includes one or more promotions for presentation to the consumer that is transmitted to the consumer via an email communication channel.

As another example, the electronic correspondence may be in the form of a presentation of search results corresponding to a search criteria inputted by the consumer into a search protocol on a webpage type of communication channel.

Another example may be a mobile application type of communication channel. For a mobile application type of communication channel, the consumer may obtain a mobile application onto a device for executing the mobile application. The mobile application may allow the consumer to access and interact with the promotion system 100. For instance, the mobile application may be executed on the device in order to allow the consumer to receive electronic correspondences on the device, and also allow the consumer to search for promotions in the promotion system 100 on the device. The mobile application may be natively installed on the device, or may alternatively be downloaded on the device from an external server. The device may be a mobile device communications device.

The three types of communication channels described above are provided for exemplary purposed only, as other types of communication channels are also contemplated.

Although the present invention has been described such that the consumer's interactions within each type of communication channel are independent of each other, the present invention also contemplates the consumer's interactions on one communication channel affecting the consumer's experience on another communication channel.

For instance, the promotion offering system 102 may have a goal of presenting the consumer with a diverse mix of promotions across multiple communication channels, up to all available communication channels. In this way, a determination that the consumer is not being presented with a diverse mix of promotions in one communication channel may prompt the promotion offering system 102 (e.g., the analytical model 104) to focus on presenting the consumer with a diverse mix of promotions via one or more other available communication channels. For instance, if the analytical model 104 determines that the consumer has been presented promotions via the email communication channel with a low level of diversity across promotion categories, sub-categories, DTs or other definable promotion attribute, the analytical model 104 may make up for this lack of diversity in the email communication channel by promoting diversity of promotions in another communication channel (e.g., search results via webpage communication channel). Further description of this aspect of the present invention is provided below with reference to FIG. 5.

Figure 5:
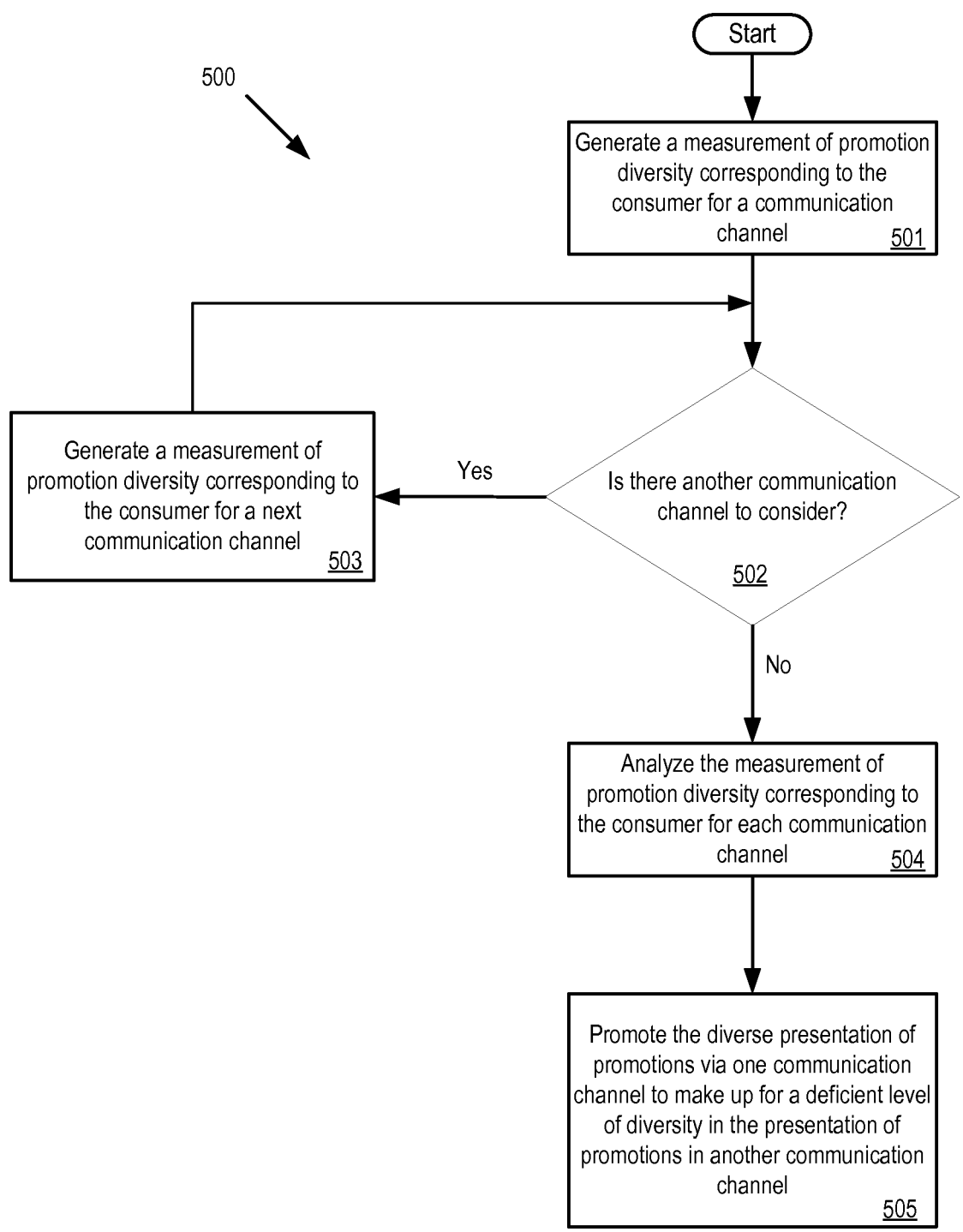
FIG. 5 illustrates a flow chart describing a process for promoting the presentation of a diverse mix of promotions across multiple communication channels.

FIG. 5 illustrates a flow chart 500 describing a process for promoting the presentation of a diverse mix of promotions across multiple communication channels.

At 501, a measurement of promotion diversity corresponding to the consumer for a given communication channel is generated. The promotion diversity measurement may measure diversity according to a number of different methods. In one embodiment, the promotion diversity measurement generated at 501 may reference the number of promotions that have been purchased by the consumer across promotion categories, sub-categories, DTs or other definable promotion attribute for a given communication channel. For example, the promotion diversity measurement may identify the number of promotions, from across promotion categories, sub-categories, DTs or other definable promotion attribute, that were purchased by the consumer resulting from the consumer viewing an email presented via the email communication channel. The past purchase history of the consumer may be obtained by accessing one or more of the databases 110, 112, 114, 116 or a repository of deals as described above.

In another embodiment, the promotion diversity measurement generated at 501 may identify the number of promotions that have been viewed by the consumer across promotion categories, sub-categories, DTs or other definable promotion attribute for a given communication channel. For example, the promotion diversity measurement may reference the number of promotions, from across promotion categories, sub-categories, DTs or other definable promotion attribute, that have been viewed by the consumer resulting from the consumer opening an email presented via the email communication channel. Data identifying emails that have been opened by the consumer, and correspondingly the promotions that were included in the opened emails, may be accessed from data stored in one or more of the databases 110, 112, 114, 116 or a repository of deals as described above.

In the context of the consumer interacting with a webpage associated with the promotion system 100, a promotion displayed on the webpage may be considered to be viewed when the consumer clicks on the promotion. Clicking on the promotion, for example, may navigate the consumer to another webpage that provides a more detailed description of the promotion. Also in the context of the consumer interacting with a webpage associated with the promotion system 100, a promotion displayed on the webpage may be considered to be viewed when the consumer hovers a mouse pointer (or other navigation tool displayed on a display screen for navigating the webpage) over the promotion for a set amount of time. Also in the context of the consumer interacting with a webpage associated with the promotion system 100, a promotion displayed on the webpage may be considered to be viewed when the consumer navigates back to the webpage displaying the promotion a set number of times.

According to another example, the promotion diversity measurement may identify the number of promotions, from across promotion categories, sub-categories, DTs or other definable promotion attribute, presented to the consumer resulting from the presentation of search results to a search request input by the consumer via the webpage communication channel. Data identifying promotions that have been presented to the consumer as search results via the webpage communication channel may be accessed from one or more of the databases 110, 112, 114, 116 or a repository of deals as described above.

In another embodiment, the promotion diversity measurement generated at 501 may reference the number of promotions that have been presented to the consumer across promotion categories, sub-categories, DTs or other definable promotion attribute for a given communication channel. For example, the promotion diversity measurement may reference the number of promotions, from across promotion categories, sub-categories, DTs or other definable promotion attribute, that have been presented to the consumer in an email that has been transmitted to the consumer via the email communication channel. A presentation of a promotion need not have been viewed by the consumer. For example, an email including promotions may have been presented to the consumer by being transmitted to the consumer, but may not have been viewed by the consumer if the consumer has not opened the email. Data identifying promotions that have been presented to the consumer via a communication channel may be accessed from one or more of the databases 110, 112, 114, 116 or a repository of deals as described above.

The actual promotion diversity measurement may be represented by a promotion diversity score. The promotion diversity score, for example, may be a standard deviation measurement taken against a standard distribution of promotions. For instance, a predetermined standard distribution of promotions from across a diverse mix of promotion categories, sub-categories, DTs or other definable promotion attribute may be set for each type of communication channel. The predetermined standard distribution of promotions may be the same, or different, across each type of communication channel.

In this way, the promotion diversity score for each communication channel may be generated by referencing the distribution of promotions purchased by the consumer in a given communication channel and measuring the standard deviation of the consumer's purchased promotions in the given communication channel against the respective predetermined standard distribution for the given communication channel.

The promotion diversity score for a given communication channel may also be generated by measuring the standard deviation of the consumer's viewed promotions in the given communication channel against the respective predetermined standard distribution for the given communication channel.

The promotion diversity score for a webpage communication channel may be generated by measuring the standard deviation of the promotions presented to the consumer as search results in the webpage communication channel against the respective predetermined standard distribution for the webpage communication channel.

The promotion diversity score for a given communication channel may also be measured by taking the standard deviation of the promotions that have been presented to the consumer in the given communication channel against the respective predetermined standard distribution for the given communication channel.

In at least these ways, the promotion diversity score may be a standard deviation measurement that compares promotions that have been purchased, viewed, presented by/to the consumer against a standard distribution of promotions for a respective communication channel.

A promotion diversity score may be considered to be high if it surpasses a set standard deviation measurement that is measured according to at least one of the methods described above. A promotion diversity score may be considered to be low if it falls below a set standard deviation that is measured according to at least one of the methods described above.

At 502, a determination is made as to whether there is another communication left to consider. If another communication channel is left to consider, then at 503 the next available communication channel is considered and a measurement of promotion diversity corresponding to the consumer is generated for the next communication channel.

When all of the communication channels have been considered, at 504 the promotion diversity measurements for each of the considered communication channels are analyzed against each other. For instance, the promotion diversity score that is generated for each communication channel considered during the process of flow chart 500 may be compared against each other. By analyzing the promotion diversity measurements for each considered communication channel, a comparative level of promotion diversity may be determined at 504.

By 505, the promotion diversity measurement for each of the considered communication channels is known from 504 and may be referenced in promoting promotion diversity across each communication channel. In this way, if the promotion diversity measurements indicate that promotion diversity is low in one communication channel, the lack of promotion diversity in the one communication channel may be made up by increasing the future promotion diversity in another communication channel at 505.

For instance, if the promotion diversity score of the email communication channel indicates that the consumer has been presented promotions via the email communication channel with a low level of promotion diversity, the analytical model 104 may promote promotion diversity in another communication channel (e.g., webpage communication channel) by increasing the promotion diversity in the other communication channel. In the case of the webpage communication channel, the promotion diversity in the webpage communication channel may be increased by presenting more promotions from promotion categories, sub-categories, DTs or other definable promotion attribute that is found to be lacking in the email communication channel.

As another example, if the promotion diversity score of the email communication channel indicates that the consumer has not purchased a diverse mix of promotions that have been viewed from emails received by the consumer via the email communication channel, the analytical model 104 may promote promotion diversity in another communication channel (e.g., webpage communication channel) by increasing the promotion diversity in the other communication channel. In the case of the webpage communication channel, the promotion diversity in the webpage communication channel may be increased by presenting more promotions from promotion categories, sub-categories, DTs or other definable promotion attribute that the consumer is found to have lacked in his past purchasing history.

In this way, promoting promotion diversity in a first communication channel in order to make up for the lack of promotion diversity in a second communication channel may be accomplished by ensuring more promotions across promotion categories, sub-categories, DTs or other definable promotion attribute that are found to be lacking in the second communication channel will be presented to the consumer via the first communication channel.

Although not illustrated in FIG. 5, the promotion diversity score may be utilized to more simply promote diversity within a given communication channel.

For instance, for a given communication channel, the corresponding promotion diversity score may be found to be low. The low promotion diversity score indicates a low level of promotion diversity across promotion categories, sub-categories, DTs or other definable promotion attribute in the given communication channel. In such a case, the analytical model 104 may reference the low promotion diversity score and determine that the consumer should be presented with more promotions from promotion categories, sub-categories, DTs or other definable promotion attributes, from which the low promotion diversity score indicates the consumer has been lacking. Then the analytical model 104 may correspondingly present the consumer with more presentations from promotion categories, sub-categories, DTs or other definable promotion attribute, that the low promotion diversity score indicates the consumer has been lacking from. The promotions may be presented to the consumer via an electronic correspondence corresponding to the given communication channel, or alternatively an electronic correspondence corresponding to one of the other communication channels.

In the case of a communication channel having a low promotion diversity score based on the consumer's past promotion purchasing history, the analytical model 104 may interpret this in two ways. The low promotion diversity score may indicate the narrow distribution of promotions across different promotion categories, sub-categories, DTs or other definable promotion attributes from which the consumer has shown interest in purchases promotions from. For instance, the consumer's past purchasing history may indicate the consumer has only purchased promotions from the restaurant and spa promotion categories.

Then according to a first embodiment, the analytical model 104 may interpret the low promotion diversity score based on the consumer's past purchasing history as an indication the consumer is only interested in purchasing promotions from the narrow distribution of promotion categories, sub-categories, DTs or other definable promotion attributes within the given communication channel. Therefore the analytical model 104 may proceed to promote the presentation of promotions from the narrow distribution of promotions as indicated by the low promotion diversity score. For instance, if the low promotion diversity score indicates the consumer has only purchased promotions from the restaurant promotion category, the analytical model 104 may continue to disproportionately promote restaurant promotions in future presentations of promotions to the consumer via the given communication channel. In addition or alternatively, the analytical model 104 may continue to disproportionately promote restaurant promotions in future presentations of promotions to the consumer via other communication channels. The analytical model 104 may promote the promotions by presenting these promotions at a higher rate than other promotions.

In a second embodiment, the analytical model 104 may interpret the low promotion diversity score based on the consumer's past purchasing history as an indication that the consumer needs to be presented with a more diverse mix of promotions within the given communication channel. So unlike the first embodiment where the analytical model 104 promotes the same type of promotions the consumer has shown a narrow interest in based on past purchasing history, according to the second embodiment the analytical model 104 will promote promotions the consumer has not shown an interest in based on the consumer's past purchasing history. For instance if the low promotion diversity score indicates the consumer has not purchased promotions from the travel promotion category, the analytical model 104 may being to disproportionately promote travel promotions in future presentations of promotions to the consumer via the given communication channel. In addition or alternatively, the analytical model 104 may being to disproportionately promote travel promotions in future presentations of promotions to the consumer via another communication channel. The analytical model 104 may promote the promotions by presenting these promotions at a higher rate than other promotions.

A high promotion diversity score indicates the consumer has purchased, viewed, or been presented with a diverse mix of promotions from across different promotion categories, sub-categories, DTs or other definable promotion attributes in the respective communication channel. In the case of a communication channel having a high promotion diversity score, the analytical model 104 may interpret the high promotion diversity score as an indication the consumer has purchased, viewed, or been presented with a diverse mix of promotions and further diversity is not required in the respective communication channel.

Figure 6:
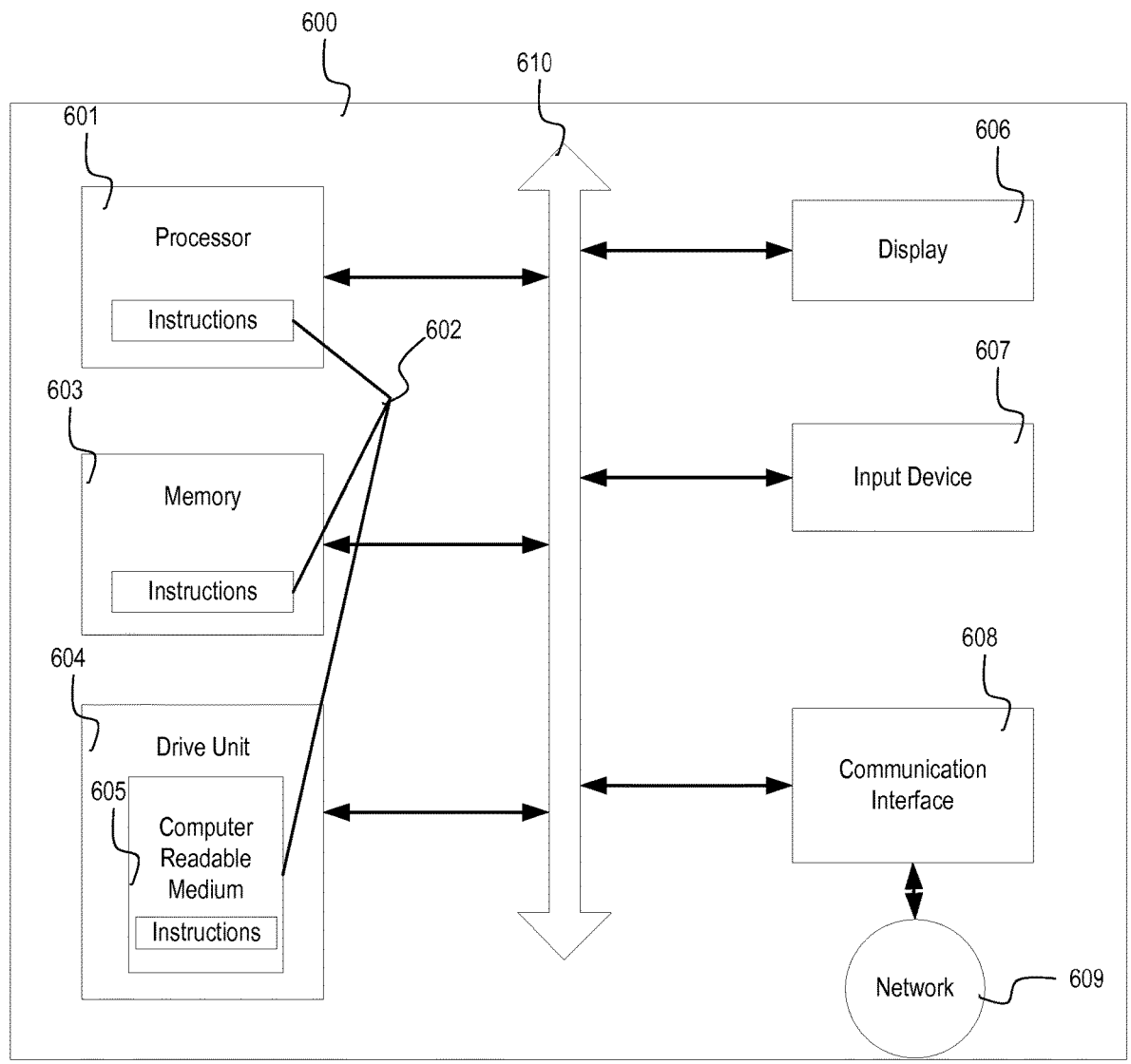
FIG. 6 is a general computer system, programmable to be a specific computer system, which may represent any of the computing devices referenced herein.

FIG. 6 illustrates a general computer system 600, programmable to be a specific computer system 600, which can represent any server, computer or component, such as consumer 1 (124), consumer N (126), merchant 1 (118), merchant M (120), and promotion offering system 102. The computer system 600 may include an ordered listing of a set of instructions 602 that may be executed to cause the computer system 600 to perform any one or more of the methods or computer-based functions disclosed herein. The computer system 600 can operate as a stand-alone device or can be connected, e.g., using the network 122, to other computer systems or peripheral devices.

In a networked deployment, the computer system 600 can operate in the capacity of a server or as a client-user computer in a server-client user network environment, or as a peer computer system in a peer-to-peer (or distributed) network environment. The computer system 600 may also be implemented as or incorporated into various devices, such as a personal computer or a mobile computing device capable of executing a set of instructions 602 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 600 can include a memory 603 on a bus 610 for communicating information. Code operable to cause the computer system to perform any of the acts or operations described herein can be stored in the memory 603. The memory 603 may be a random-access memory, read-only memory, programmable memory, hard disk drive or any other type of volatile or non-volatile memory or storage device.

The computer system 600 can include a processor 601, such as a central processing unit (CPU) and/or a graphics processing unit (GPU). The processor 601 may include one or more general processors, digital signal processors, application specific integrated circuits, field programmable gate arrays, digital circuits, optical circuits, analog circuits, combinations thereof, or other now known or later-developed devices for analyzing and processing data. The processor 601 may implement the set of instructions 602 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 600 can also include a disk or optical drive unit 604. The disk drive unit 604 may include a computer-readable medium 605 in which one or more sets of instructions 602, e.g., software, may be embedded. Further, the instructions 602 may perform one or more of the operations as described herein. The instructions 602 may reside completely, or at least partially, within the memory 603 or within the processor 601 during execution by the computer system 600. Accordingly, the databases 110, 112, 114, or 116 may be stored in the memory 603 or the disk unit 604.

The memory 603 and the processor 601 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 600 may include an input device 607, such as a keyboard or mouse, configured for a user to interact with any of the components of system 600. It may further include a display 606, such as a liquid crystal display (LCD), a cathode ray tube (CRT), or any other display suitable for conveying information. The display 606 may act as an interface for the user to see the functioning of the processor 601, or specifically as an interface with the software stored in the memory 603 or the drive unit 604.

The computer system 600 may include a communication interface 608 that enables communications via the communications network 122. The network 122 may include wired networks, wireless networks, or combinations thereof. The communication interface 608 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion offering system 102, as depicted in FIG. 1 may comprise one computer system or multiple computer systems. Further, the flow diagrams illustrated in the Figures may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:
1. A method comprising:
   accessing, via a processor and from a historical data database, each of one or more promotions included in a previously-sent electronic correspondence;
   accessing, via the processor from a promotion programs database, multiple promotions contemplated for inclusion in a subsequent electronic correspondence, wherein each taxonomy classification comprises one or both of a category or a subcategory, and wherein the electronic correspondence includes N number of positions for promotions;
   reducing a number contemplated promotions necessary to be considered in a determination of a final set of promotions that are to be presented, by eliminating any need to consider a subset of contemplated promotions due to the subset of the contemplated promotions failing to meet at least one of a set of specific thresholds, including a predetermined time period in which particular categories or subcategories of promotions are restricted, a predetermined time period in which repeat offers of promotions are restricted, and a predetermined number of promotions having the same or similar categories or subcategories that can be included in a particular electronic correspondence;
   refraining, via the processor, from inclusion, one or more promotions from the multiple promotions contemplated for inclusion in the subsequent electronic correspondence in an instance in which a particular set of criteria for determining that the one or more promotions from the multiple promotions contemplated for inclusion in the subsequent electronic correspondence is similar to one or more promotions included in the previously-sent electronic correspondence,
wherein refraining from inclusion by determining if the particular set of criteria for determining the similarity is met comprises:
scoring each of the multiple promotions;
ranking the multiple promotions based on the scores;
comparing, via the processor, taxonomy classifications of at least one of the promotions in the previously-sent electronic correspondence and at least one of the multiple promotions contemplated for inclusion in the subsequent electronic correspondence in order to determine whether the at least one of the promotions in the previously-sent electronic correspondence and the at least one of the multiple promotions have a same taxonomy classification, wherein comparing the taxonomy classification for the at least two of the multiple promotions comprises determining whether one or both of the category or subcategory of one of the at least two of the multiple promotions is the same as one or both of the category or the subcategory of the other of the at least two of the multiple promotions, and
wherein comparing the taxonomy classification for at least two of the multiple promotions comprises comparing the taxonomy classification for at least two of a top N ranked promotions; and
in response to determining that one or more of the promotions in the previously-sent electronic correspondence and one or more of the multiple promotions have the same taxonomy classification,
determining, via the processor, whether to remove at least one of the multiple promotions having the same taxonomy classification as one or more of the promotions in the previously-sent electronic correspondence,
wherein the determining whether to remove at least one of the multiple promotions having the same taxonomy classification as one or more of the promotions in the previously-sent electronic correspondence comprises:
obtaining a previous time at which each of the one or more of the multiple promotions was provided in the previously-sent electronic correspondence;
determining a status of the consumer at the previous time at which the previously-sent electronic correspondence was presented;
upon a determination that the status is indicative of inactivity, disregarding the previous time at which the previously-sent electronic correspondence was presented;
determining an amount of time between transmission of the previously-sent electronic correspondence and expected transmission of the subsequent electronic correspondence as a function of the previous time and an anticipated time of the subsequent electronic correspondence;
determining whether the amount of time meets a first predetermined threshold;
in an instance in which the amount of time fails to meet the first predetermined threshold, identifying that the determination of whether to include the promotion in the subsequent electronic correspondence is subject to a correction value;
determining whether the amount of time meets a second predetermined threshold;

in an instance in which the amount of time fails to meet the second predetermined threshold, removing the promotion from inclusion in the subsequent electronic correspondence;
for each remaining promotion of the one or more of the multiple promotions provided in the previously-sent electronic correspondence, accessing a promotion database, to reference a look-up table, the look-up table identifying a correction factor as a function of the amount of time since the consumer was presented with the previously-sent electronic correspondence, wherein as the amount of time since the consumer was presented with the previously-sent electronic correspondence increases, the correction factor is determined to have a value that will impact each of the one or more of the multiple promotions provided in the previously-sent electronic correspondence less; and
based on the value of the correction value of each of the one or more of the multiple promotions provided in the previously-sent electronic correspondence, determining which promotions of the one or more of the multiple promotions provided in the previously-sent electronic correspondence to remove from the subsequent electronic correspondence;
generating, via the processor, the subsequent electronic correspondence, the subsequent electronic correspondence comprising the multiple promotions contemplated for inclusion minus the one or more promotions from the multiple promotions contemplated for inclusion refrained from inclusion; and
presenting, via a display, in a real-time webpage content presentation or mobile push notification, the subsequent electronic correspondence.

2. The method of claim 1, wherein the predetermined amount of time is dependent on the taxonomy classification of the one of the multiple promotions.

3. A system comprising:
a processor; and
a memory in communication with the processor and storing processor-executable instructions
that, when executed, cause the processor to:
access, via a processor and from a historical data database, each of one or more promotions included in a previously-sent electronic correspondence;
access, via the processor from a promotion programs database, multiple promotions contemplated for inclusion in a subsequent electronic correspondence, wherein each taxonomy classification comprises one or both of a category or a subcategory, and wherein the electronic correspondence includes N number of positions for promotions;
reduce a number contemplated promotions necessary to be considered in a determination of a final set of promotions that are to be presented, by eliminating any need to consider a subset of contemplated promotions due to the subset of the contemplated promotions failing to meet at least one of a set of specific thresholds, including a predetermined time period in which particular categories or subcategories of promotions are restricted, a predetermined time period in which repeat offerors of promotions are restricted, and a predetermined number of promotions having the same or similar categories or subcategories that can be included in a particular electronic correspondence;

refrain, via the processor, from inclusion, one or more promotions from the multiple promotions contemplated for inclusion in the subsequent electronic correspondence in an instance in which a particular set of criteria for determining that the one or more promotions from the multiple promotions contemplated for inclusion in the subsequent electronic correspondence is similar to one or more promotions included in the previously-sent electronic correspondence, wherein refraining from inclusion by determining if the particular set of criteria for determining the similarity is met comprises:

score each of the multiple promotions;

rank the multiple promotions based on the scores;

compare, via the processor, taxonomy classifications of at least one of the promotions in the previously-sent electronic correspondence and at least one of the multiple promotions contemplated for inclusion in the subsequent electronic correspondence in order to determine whether the at least one of the promotions in the previously-sent electronic correspondence and the at least one of the multiple promotions have a same taxonomy classification, wherein comparing the taxonomy classification for the at least two of the multiple promotions comprises determining whether one or both of the category or subcategory of one of the at least two of the multiple promotions is the same as one or both of the category or the subcategory of the other of the at least two of the multiple promotions, and wherein comparing the taxonomy classification for at least two of the multiple promotions comprises comparing the taxonomy classification for at least two of a top N ranked promotions; and in response to determining that one or more of the promotions in the previously-sent electronic correspondence and one or more of the multiple promotions have the same taxonomy classification, determine, via the processor, whether to remove at least one of the multiple promotions having the same taxonomy classification as one or more of the promotions in the previously-sent electronic correspondence, wherein the determining, via the processor, whether to remove at least one of the multiple promotions having the same taxonomy classification as one or more of the promotions in the previously-sent electronic correspondence comprises:

obtaining, via the processor, a previous time at which each of the one or more of the multiple promotions was provided in the previously-sent electronic correspondence;

determining a status of the consumer at the previous time at which the previously-sent electronic correspondence was presented;

upon a determination that the status is indicative of inactivity, disregarding the previous time at which the previously-sent electronic correspondence was presented;

determining an amount of time between transmission of the previously-sent electronic correspondence and expected transmission of the subsequent electronic correspondence as a function of the previous time and an anticipated time of the subsequent electronic correspondence;

determining whether the amount of time meets a first predetermined threshold;

in an instance in which the amount of time fails to meet the first predetermined threshold, identifying that the determination of whether to include the promotion in the subsequent electronic correspondence is subject to a correction value;

determining whether the amount of time meets a second predetermined threshold;

in an instance in which the amount of time fails to meet the second predetermined threshold, removing the promotion from inclusion in the subsequent electronic correspondence;

for each remaining promotion of the one or more of the multiple promotions provided in the previously-sent electronic correspondence, accessing a promotion database, to reference a look-up table, the look-up table identifying a correction factor as a function of the amount of time since the consumer was presented with the previously-sent electronic correspondence, wherein as the amount of time since the consumer was presented with the previously-sent electronic correspondence increases, the correction factor is determined to have a value that will impact each of the one or more of the multiple promotions provided in the previously-sent electronic correspondence less; and based on the value of the correction value of each of the one or more of the multiple promotions provided in the previously-sent electronic correspondence, determining which promotions of the one or more of the multiple promotions provided in the previously-sent electronic correspondence to remove from the subsequent electronic correspondence;

generate, via the processor, the subsequent electronic correspondence, the subsequent electronic correspondence comprising the multiple promotions contemplated for inclusion minus the one or more promotions from the multiple promotions contemplated for inclusion refrained from inclusion; and present, via a display, in a real-time webpage content presentation or mobile push notification, the subsequent electronic correspondence.

4. The system of claim 3, wherein the predetermined amount of time is dependent on the taxonomy classification of the one of the multiple promotions.

5. A method comprising:

accessing, via a processor from a promotion programs database, multiple promotions contemplated for inclusion in the electronic correspondence, each of the multiple promotions including an associated taxonomy classification, wherein each taxonomy classification comprises one or both of a category or a subcategory, and wherein the electronic correspondence includes N number of positions for promotions;

reducing a number contemplated promotions necessary to be considered in a determination of a final set of promotions that are to be presented, by eliminating any need to consider a subset of contemplated promotions due to the subset of the contemplated promotions failing to meet at least one of a set of specific thresholds, including a predetermined time period in which particular categories or subcategories of promotions are restricted, a predetermined time period in which repeat offerors of promotions are restricted, and a predetermined number of promotions having the same or similar categories or subcategories that can be included in a particular electronic correspondence;

refraining, via the processor, from inclusion, one or more promotions from the multiple promotions contemplated for inclusion in a subsequent electronic correspondence in an instance in which a particular set of criteria for determining that the one or more promotions from the multiple promotions contemplated for inclusion in the subsequent electronic correspondence is similar to a second promotion from the one or more promotions from the multiple promotions contemplated for inclusion in the subsequent electronic correspondence, wherein refraining from inclusion by determining if the particular set of criteria for determining the similarity is met comprises:

scoring each of the multiple promotions;

ranking the multiple promotions based on the scores;

comparing, via the processor, the taxonomy classification for at least two of the multiple promotions in order to determine whether the at least two of the multiple promotions have a same taxonomy classification, wherein comparing the taxonomy classification for the at least two of the multiple promotions comprises determining whether one or both of the category or subcategory of one of the at least two of the multiple promotions is the same as one or both of the category or the subcategory of the other of the at least two of the multiple promotions, and wherein comparing the taxonomy classification for at least two of the multiple promotions comprises comparing the taxonomy classification for at least two of a top N ranked promotions; and in response to determining that the at least two of the multiple promotions have the same taxonomy classification, determining to remove one of the at least two of the multiple promotions from inclusion in the electronic correspondence, wherein the determining whether to remove at least one of the multiple promotions having the same taxonomy classification as one or more of the promotions in the previously-sent electronic correspondence comprises:

obtaining, via the processor, a previous time at which each of the one or more of the multiple promotions was provided in the previously-sent electronic correspondence;

determining a status of the consumer at the previous time at which the previously-sent electronic correspondence was presented;

upon a determination that the status is indicative of inactivity, disregarding the previous time at which the previously-sent electronic correspondence was presented;

determining an amount of time between transmission of the previously-sent electronic correspondence and expected transmission of the subsequent electronic correspondence as a function of the previous time and an anticipated time of the subsequent electronic correspondence;

determining, via the processor, whether the amount of time meets a first predetermined threshold;

in an instance in which the amount of time fails to meet the first predetermined threshold, identifying that the determination of whether to include the promotion in the subsequent electronic correspondence is subject to a correction value;

determining whether the amount of time meets a second predetermined threshold;

in an instance in which the amount of time fails to meet the second predetermined threshold, removing the promotion from inclusion in the subsequent electronic correspondence;

for each remaining promotion of the one or more of the multiple promotions provided in the previously-sent electronic correspondence, accessing a promotion database, to reference a look-up table, the look-up table identifying a correction factor as a function of the amount of time since the consumer was presented with the previously-sent electronic correspondence; and based on the value of the correction value of each of the one or more of the multiple promotions provided in the previously-sent electronic correspondence, determining which promotions of the one or more of the multiple promotions provided in the previously-sent electronic correspondence to remove from the subsequent electronic correspondence, wherein as the amount of time since the consumer was presented with the previously-sent electronic correspondence increases, the correction factor is determined to have a value that will impact each of the one or more of the multiple promotions provided in the previously-sent electronic correspondence less; and generating, via the processor, the subsequent electronic correspondence, the subsequent electronic correspondence comprising the multiple promotions contemplated for inclusion minus the one or more promotions from the multiple promotions contemplated for inclusion refrained from inclusion; and presenting, via a display, in a real-time webpage content presentation or mobile push notification, the subsequent electronic correspondence.

6. The method of claim 5, wherein in response to determining that at least two of the top N ranked promotions have a same taxonomy classification, selecting a N+1 ranked promotion for comparing the taxonomy classification.

7. A system comprising:

a memory storing processor-executable instructions; and a processor in communication with the memory, where the processor is configured to execute the processor-executable instructions to:

access, via a processor and from a historical data database, each of multiple promotions contemplated for inclusion in the electronic correspondence, each of the multiple promotions including an associated taxonomy classification, wherein each taxonomy classification comprises one or both of a category or a subcategory, and wherein the electronic correspondence includes N number of positions for promotions;

reduce a number contemplated promotions necessary to be considered in a determination of a final set of promotions that are to be presented, by eliminating any need to consider a subset of contemplated promotions due to the subset of the contemplated promotions failing to meet at least one of a set of specific thresholds, including a predetermined time period in which particular categories or subcategories of promotions are restricted, a predetermined time period in which repeat offerors of promotions are restricted, and a predetermined number of promotions having the same or similar categories or subcategories that can be included in a particular electronic correspondence;

refrain, via the processor, from inclusion, one or more promotions from the multiple promotions contemplated for inclusion in a subsequent electronic correspondence in an instance in which a particular set of criteria for determining that the one or more promotions from the multiple promotions contemplated for inclusion in the subsequent electronic correspondence is similar to a second promotion from the one or more promotions from the multiple promotions contemplated for inclusion in the subsequent electronic correspondence, wherein refraining from inclusion by determining if the particular set of criteria for determining the similarity is met comprises:

score each of the multiple promotions;

rank the multiple promotions based on the scores;

compare, via the processor, the taxonomy classification for at least two of the multiple promotions in order to determine whether the at least two of the multiple promotions have a same taxonomy classification, wherein comparing the taxonomy classification for the at least two of the multiple promotions comprises determining whether one or both of the category or subcategory of one of the at least two of the multiple promotions is the same as one or both of the category or the subcategory of the other of the at least two of the multiple promotions, and wherein comparing the taxonomy classification for at least two of the multiple promotions comprises comparing the taxonomy classification for at least two of a top N ranked promotions; and in response to determining that the at least two of the multiple promotions have the same taxonomy classification, determine to remove one of the at least two of the multiple promotions from inclusion in the electronic correspondence, wherein the determining whether to remove at least one of the multiple promotions having the same taxonomy classification as one or more of the promotions in the previously-sent electronic correspondence comprises:

obtaining, via the processor, a previous time at which each of the one or more of the multiple promotions was provided in the previously-sent electronic correspondence;

determining a status of the consumer at the previous time at which the previously-sent electronic correspondence was presented;

upon a determination that the status is indicative of inactivity, disregarding the previous time at which the previously-sent electronic correspondence was presented;

determining, via the processor, an amount of time between transmission of the previously-sent electronic correspondence and expected transmission of the subsequent electronic correspondence as a function of the previous time and an anticipated time of the subsequent electronic correspondence;

determining whether the amount of time meets a first predetermined threshold;

in an instance in which the amount of time fails to meet the first predetermined threshold, identifying that the determination of whether to include the promotion in the subsequent electronic correspondence is subject to a correction value;

determining whether the amount of time meets a second predetermined threshold;

in an instance in which the amount of time fails to meet the second predetermined threshold, removing the promotion from inclusion in the subsequent electronic correspondence;

for each remaining promotion of the one or more of the multiple promotions provided in the previously-sent electronic correspondence, accessing a promotion database, to reference a look-up table, the look-up table identifying a correction factor as a function of the amount of time since the consumer was presented with the previously-sent electronic correspondence, wherein as the amount of time since the consumer was presented with the previously-sent electronic correspondence increases, the correction factor is determined to have a value that will impact each of the one or more of the multiple promotions provided in the previously-sent electronic correspondence less; and based on the value of the correction value of each of the one or more of the multiple promotions provided in the previously-sent electronic correspondence, determining which promotions of the one or more of the multiple promotions provided in the previously-sent electronic correspondence to remove from the subsequent electronic correspondence; and generate, via the processor, the subsequent electronic correspondence, the subsequent electronic correspondence comprising the multiple promotions contemplated for inclusion minus the one or more promotions from the multiple promotions contemplated for inclusion refrained from inclusion; and present, via a display, in a real-time webpage content presentation or mobile push notification, the subsequent electronic correspondence.

8. The system of claim 7, wherein in response to determining that at least two of the top N ranked promotions has a same taxonomy classification, the processor is configured to select a N+1 ranked promotion for comparing the taxonomy classification.

* * * * *

UNITED STATES PATENT AND TRADEMARK OFFICE
CERTIFICATE OF CORRECTION

PATENT NO. : 10,943,253 B1  
APPLICATION NO. : 13/841433  
DATED : March 9, 2021  
INVENTOR(S) : Aggarwal et al.

Page 1 of 1

It is certified that error appears in the above-identified patent and that said Letters Patent is hereby corrected as shown below:

On the Title Page

Item (72) Inventors: "Amit Aggarwal, Sunn, CA (US)" should read --Amit Aggarwal, Sunnyvale, CA (US)--.

Signed and Sealed this  
Thirteenth Day of September, 2022

Katherine Kelly Vidal  
*Director of the United States Patent and Trademark Office*